US005686742A

United States Patent [19]
Takeuchi

[11] Patent Number: 5,686,742
[45] Date of Patent: Nov. 11, 1997

[54] CCD TYPE SOLID STATE IMAGE PICKUP DEVICE HAVING HIGH CHARGE TRANSFER EFFICIENCY

[75] Inventor: Eiichi Takeuchi, Tokyo, Japan

[73] Assignee: NEC Corporation, Tokyo, Japan

[21] Appl. No.: 656,470

[22] Filed: May 31, 1996

[30] Foreign Application Priority Data

May 31, 1995 [JP] Japan ................................. 7-133697

[51] Int. Cl.⁶ .................... H01L 27/148; H01L 29/768
[52] U.S. Cl. ............................................ 257/233; 257/245
[58] Field of Search .................................. 257/232, 233, 257/245; 377/60

[56] References Cited

U.S. PATENT DOCUMENTS 4,803,710  2/1989  Elabo ............................... 257/232
5,396,121  3/1995  Watanabe ......................... 257/232
5,434,437  7/1995  Itakura et al. ..................... 257/232

Primary Examiner—Gene M. Munson
Attorney, Agent, or Firm—Foley & Lardner

[57] ABSTRACT

In a CCD type solid state image pickup device including two-dimensionally arranged photo/electro conversion portions, a plurality of vertical shift registers each connected to one column of the photo/electro conversion portions, and a horizontal transfer portion connected to the vertical shift register, signal charges of every four of each column of the photo/electro conversion portions are mixed within the vertical shift registers or within the vertical transfer portions and the horizontal output register, to create a mixed signal charge. Then, the mixed signal charge corresponding to four of the photo/electro conversion portions is transferred within the horizontal output register. Thus, one scanning line is formed by every four rows of the photo/electro conversion portions.

6 Claims, 20 Drawing Sheets

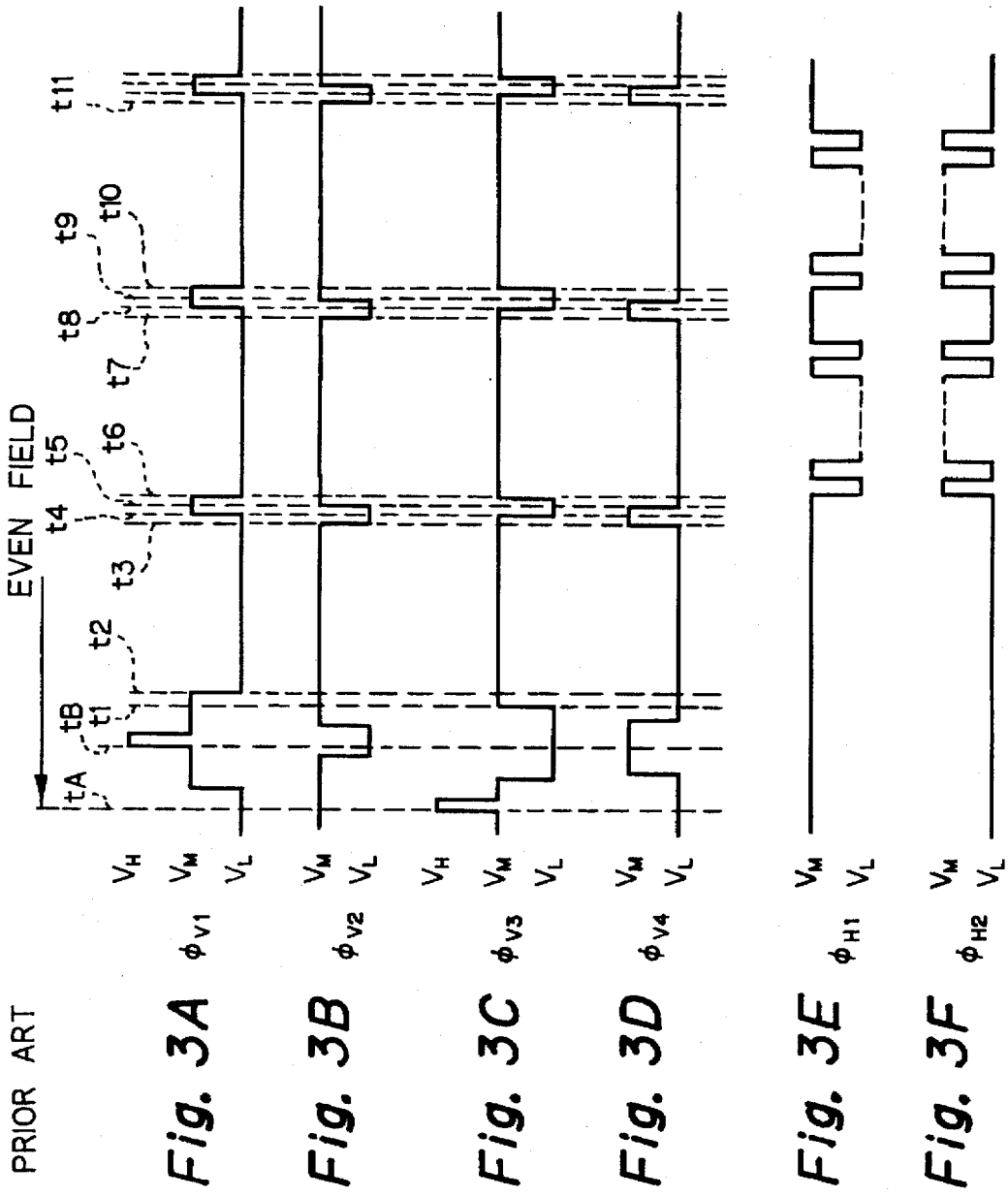

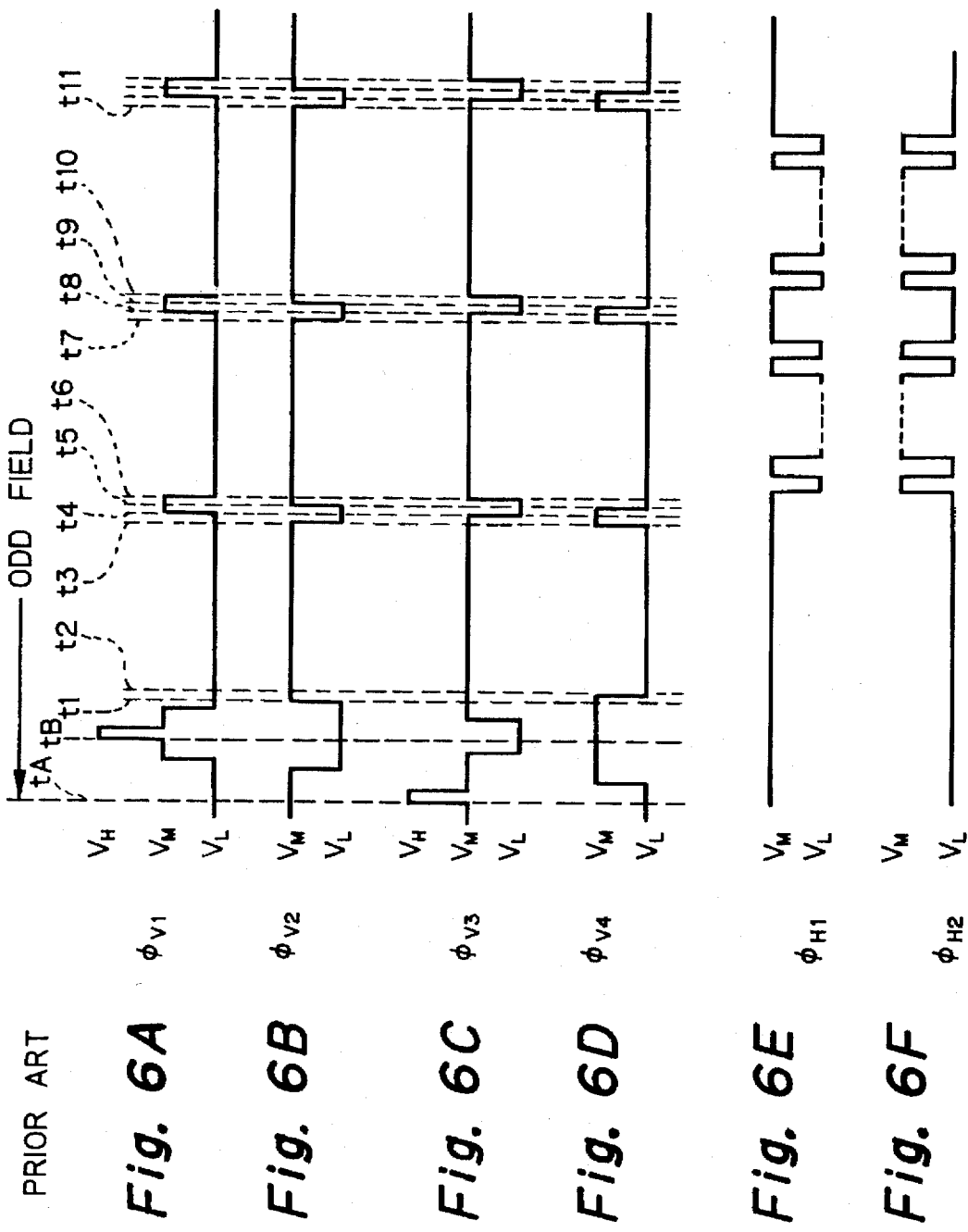

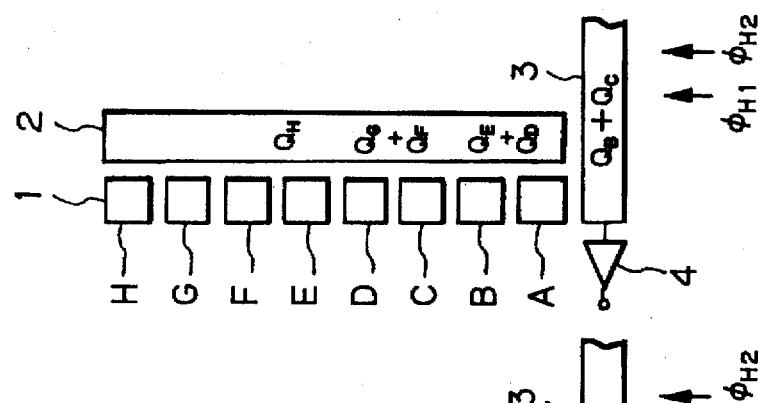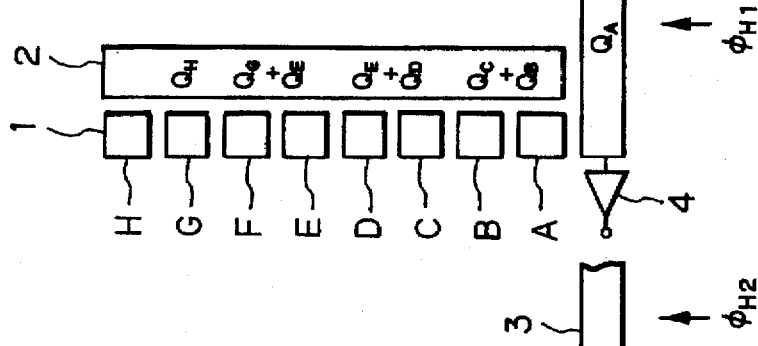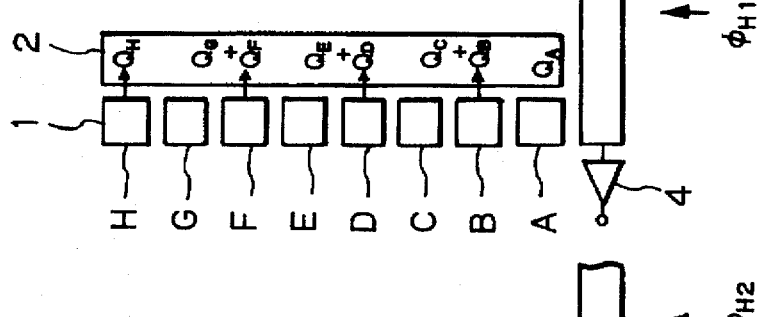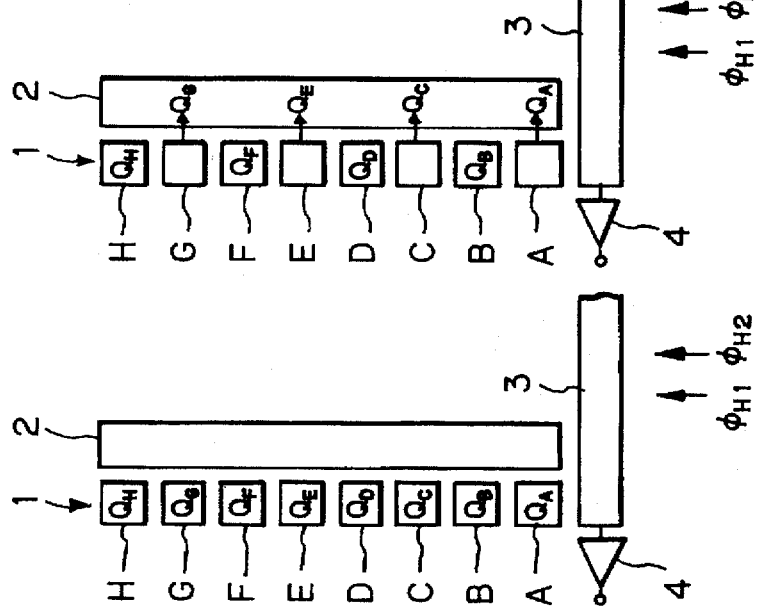

CCD TYPE SOLID STATE IMAGE PICKUP DEVICE HAVING HIGH CHARGE TRANSFER EFFICIENCY

BACKGROUND OF THE INVENTION

1. Field of the Invention

The present invention relates to a charge coupled device (CCD) type solid state image pickup device.

2. Description of the Related Art

Two-dimensional CCD type solid state pickup devices instead of pickup tubes have been used in family video cameras, electronic news gathering (ENG) cameras and the like.

In a prior art CCD type solid state image pickup device which includes two-dimensionally arranged photo/electro conversion portions, a plurality of vertical shift registers each connected to one column of the photo/electro conversion portions, and a horizontal output register connected to the vertical shift registers, signal charges of every two of each column of the photo/electro conversion portions are mixed within the vertical shift registers, to create a mixed signal charge. Then, the mixed signal charge corresponding to two of the photo/electro conversion portions is transferred within the horizontal output register. Thus, one scanning line is formed by every two rows of the photo/electro conversion portions. This will be explained later in detail.

In the above described prior art CCD type solid state image pickup device, however, when the density of pixels in the horizontal direction is increased to enhance the resolution, the width of the vertical shift registers is reduced. As a result, the ratio of a width to a length of transfer electrodes of the vertical shift registers is reduced. Therefore, the electric field within the vertical shift registers along the vertical shift direction is reduced, and accordingly, the efficiency of charge transfer is deteriorated.

SUMMARY OF THE INVENTION

It is an object of the present invention to provide a CCD type solid state image pickup device having a high charge transfer efficiency.

According to the present invention, in a CCD type solid state image pickup device including two-dimensionally arranged photo/electro conversion portions, a plurality of vertical shift registers each connected to one column of the photo/electro conversion portions, and a horizontal output register connected to the vertical shift registers, signal charges of every four of each column of the photo/electro conversion portions are mixed within the vertical shift registers or within the vertical shift registers and the horizontal output register, to create a mixed signal charge. Then, the mixed signal charge corresponding to four of the photo/electro conversion portions is transferred within the horizontal output register. Thus, one scanning line is formed by every four rows of the photo/electro conversion portions. This increases the ratio of a width to a length of transfer electrodes of the vertical shift registers.

BRIEF DESCRIPTION OF THE DRAWINGS

The present invention will be more clearly understood from the description as set forth below, as compared with the prior art, with reference to the accompanying drawings, wherein:

FIGS. 3A, 3B, 3C, 3D, 3E and 3F are timing diagrams for explaining an even field mode operation of the device of FIG. 1;

FIGS. 6A, 6B, 6C, 6D, 6E and 6F are timing diagrams for explaining an odd field mode operation of the device of FIG. 1;

FIGS. 7A, 7B, 7C, 7D and 7E are plan views of the device of FIG. 1 for explaining transfer of signal charge in the odd field mode operation;

DESCRIPTION OF THE PREFERRED EMBODIMENTS

Before the description of the preferred embodiments, a prior art CCD type solid state image pickup device will be explained with reference to FIGS. 1, 2, 3A through 3F, 4A through 4D, 5, 6A through 6F, 7A through 7E, and 8A.

Figure 1:
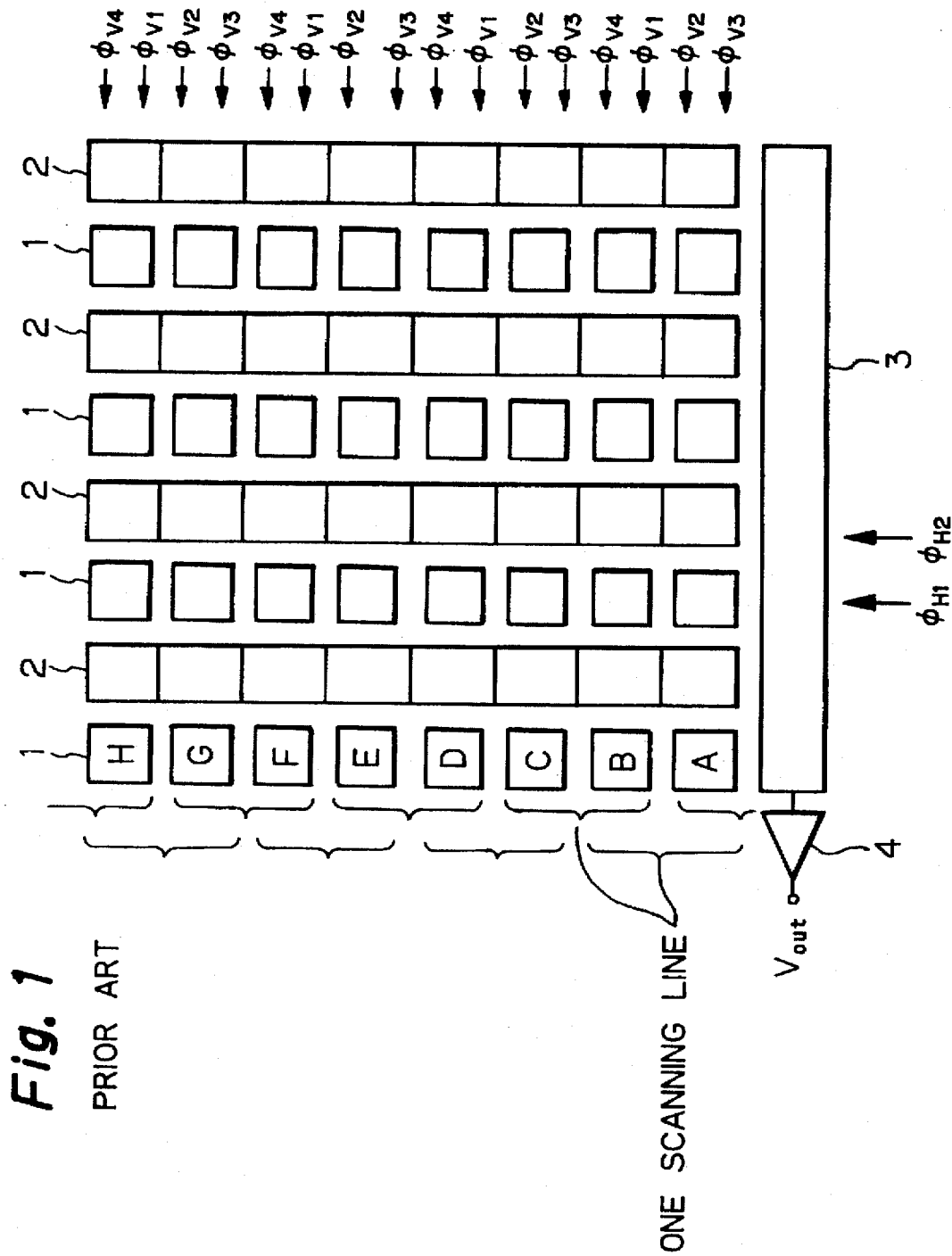
FIG. 1 is a plan view illustrating a prior art CCD type solid state image pickup device.

In FIG. 1, which is a plan view illustrating a prior art CCD type solid state image pickup device, light is incident to two-dimensionally arranged photo/electro conversion portions 1 formed by photo diodes, and as a result, signal charges obtained by the photo/electro conversion portions 1 are transferred to vertical shift register 2. The signal charges are further transferred via a horizontal output register 3 to a signal charge output register 4 which generates an output voltage $V_{out}$. The vertical shift registers 2 are operated by four-phase transfer pulse signals $\phi_{v1}$, $\phi_{v2}$, $\phi_{v3}$ and $\phi_{v4}$, and the horizontal output register 3 is operated by two-phase transfer pulse signals $\phi_{H1}$ and $\phi_{H2}$.

In FIG. 1, note that every two rows of the photo/electro conversion portions 1 form one scanning line.

Figure 2:
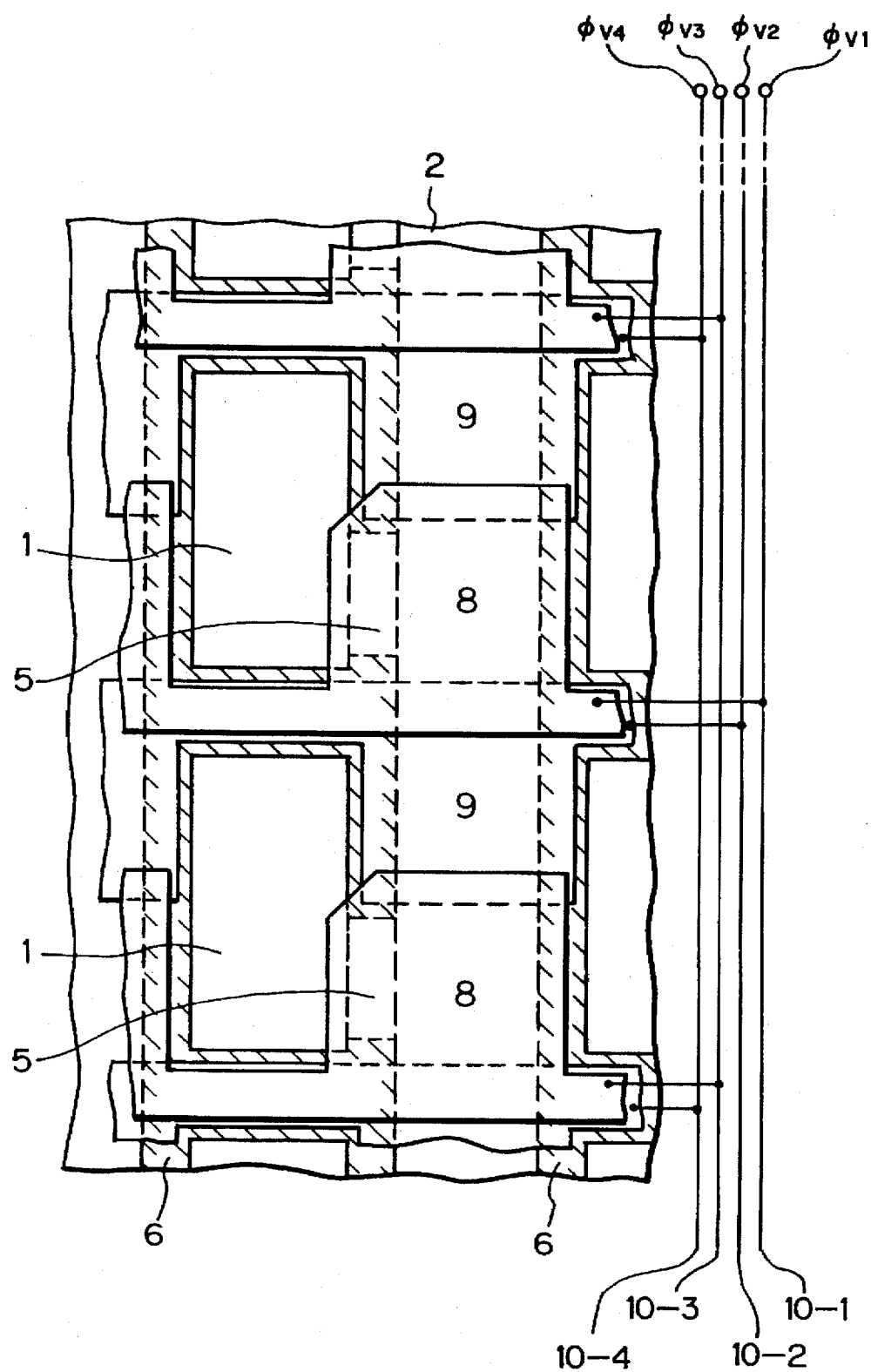
FIG. 2 is a partially enlarged plan view of the device of FIG. 1.

In FIG. 2, which is a partially enlarged plan view of the device of FIG. 1, each of the photo/electro conversion portions 1 include a $P^+$-type impurity diffusion region and an N-type impurity diffusion region formed on a P-type well region of a N-type semiconductor substrate. The vertical shift register 2 include N-type buried channels formed on the P-type well region. Provided between the photo/electro conversion portions 1 and the vertical shift registers 2 are read gate regions 5. Every column of the photo/electro portions 1 and the vertical shift registers 2 is isolated from the other columns by a $P^+$-type channel stopper region 6.

Two transfer electrodes 8 and 9 are provided for each column of the photo/electro conversion portions 1. In this case, the transfer electrodes 8 also serve as read gates for the read gate regions 5. The transfer electrodes 9 are made of a first polycrystalline silicon layer, and the transfer electrodes 8 are made of a second polycrystalline silicon layer.

Also, four bus lines 10-1, 10-2, 10-3 and 10-4 made of aluminum are provided and connected to the transfer electrodes 8 and 9. The transfer pulse signals $\phi_{v1}$, $\phi_{v2}$, $\phi_{v3}$ and $\phi_{v4}$ are supplied to the bus lines 10-1, 10-2, 10-3 and 10-4, respectively.

The operation of the device of FIG. 1 is by interlaced scanning.

Figure 4A:
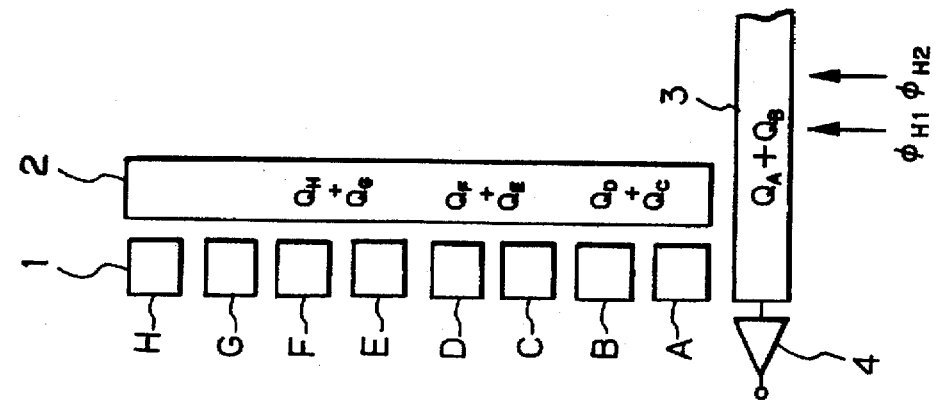
FIGS. 4A, 4B, 4C and 4D are plan views of the device of FIG. 1 for explaining transfer of signal charge in the even field mode operation.

An even field mode will now be explained with reference to FIGS. 3A through 3F, 4A through 4D, and 5. In this case, assume that signal charges $Q_A$, $Q_B$, ..., $Q_H$ are stored in the photo/electro conversion portions 1 denoted by A, B, ..., H as shown in FIG. 4A.

Figure 4B:
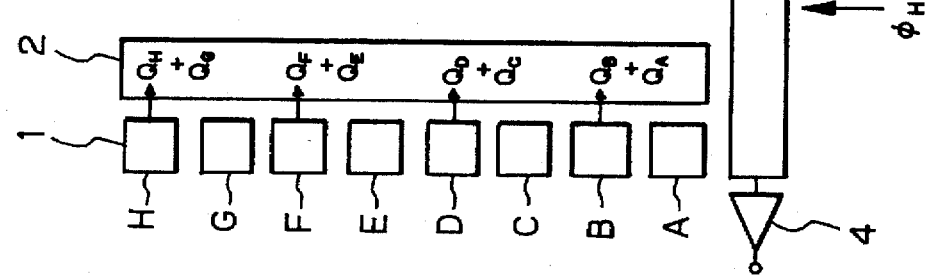

First, at time tA, the transfer pulse signals $\phi_{v1}$, $\phi_{v2}$, $\phi_{v3}$ and $\phi_{v4}$ are $V_L$, $V_M$, $V_H$ and $V_L$, respectively, as shown in FIGS. 3A, 3B, 3C and 3D. As a result, the signal charges $Q_A$, $Q_C$, $Q_E$ and $Q_G$ are read out to the vertical shift register 2 as shown in FIG. 4B.

Figure 4C:
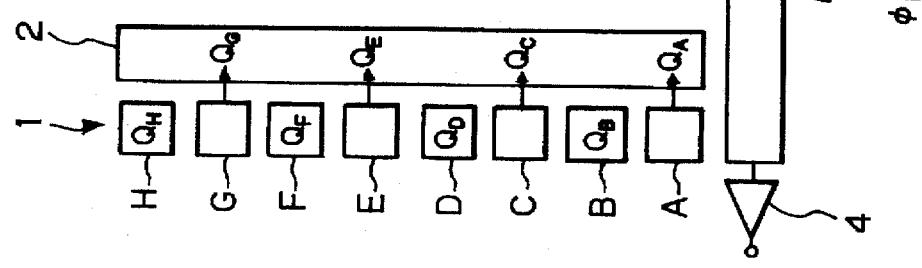

Next, at time tB, the transfer pulse signals $\phi_{v1}$, $\phi_{v2}$, $\phi_{v3}$ and $\phi_{v4}$ are $V_H$, $V_L$, $V_L$ and $V_M$, respectively, as shown in FIGS. 3A, 3B, 3C and 3D. As a result, the signal charges $Q_B$, $Q_D$, $Q_F$ and $Q_H$ are read out to the vertical shift register 2 as shown in FIG. 4C. In this case, the charges $Q_B$, $Q_D$, $Q_F$ and $Q_H$ are added to the charges $Q_A$, $Q_C$, $Q_E$ and $Q_G$, respectively, to form signal charges $Q_A+Q_B$, $Q_C+Q_D$, $Q_E+Q_F$ and $Q_G+Q_H$.

Figure 4D:
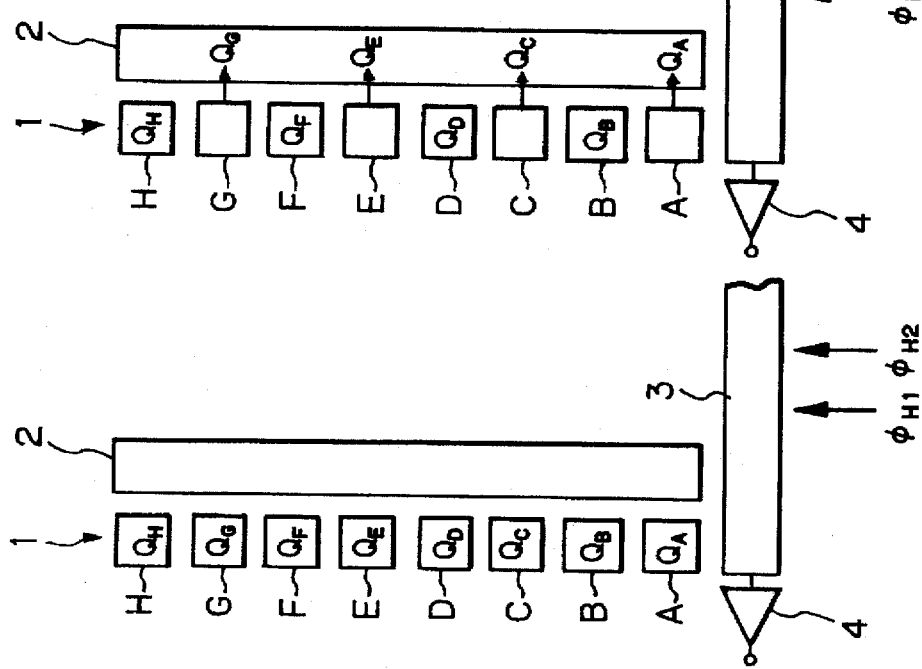
Figure 5:
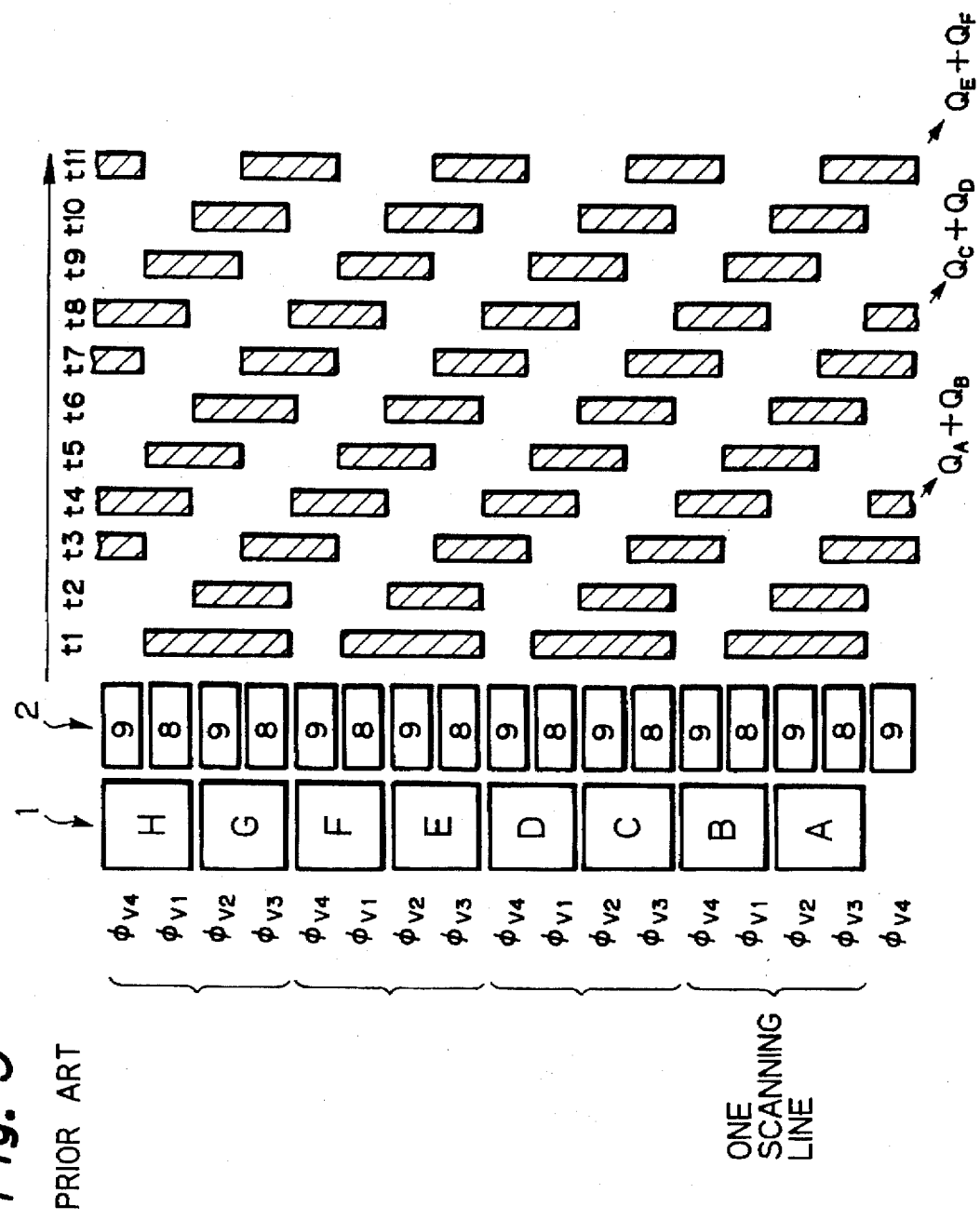
FIG. 5 is a diagram for showing transfer of signal charge in the even field mode operation of the device of FIG. 1.

Next, at time t1, the transfer pulse signals $\phi_{v1}$, $\phi_{v2}$, $\phi_{v3}$ and $\phi_{v4}$ are $V_M$, $V_M$, $V_M$ and $V_L$, respectively, as shown in FIGS. 3A, 3B, 3C and 3D, and as a result, the potential wells are deep as shown by shaded portions at time t1 in FIG. 5. Subsequently, at time t2, the transfer pulse signals $\phi_{v1}$, $\phi_{v2}$, $\phi_{v3}$ and $\phi_{v4}$ are $V_L$, $V_M$, $V_M$ and $V_L$, respectively, as shown in FIGS. 3A, 3B, 3C and 3D, and as a result, the potential wells are deep as shown by shaded portions at time t2 in FIG. 5. Subsequently, at time t3, the transfer pulse signals $\phi_{v1}$, $\phi_{v2}$, $\phi_{v3}$ and $\phi_{v4}$ are $V_L$, $V_L$, $V_M$ and $V_M$, respectively, as shown in FIGS. 3A, 3B, 3C and 3D, and as a result, the potential wells are deep as shaded at time t3 in FIG. 5. Subsequently, at time t4, the transfer pulse signals $\phi_{v1}$, $\phi_{v2}$, $\phi_{v3}$ and $\phi_{v4}$ are $V_M$, $V_L$, $V_L$ and $V_M$, respectively, as shown in FIGS. 3A, 3B, 3C and 3D, and as a result, the potential wells are deep as shaded at time t4 in FIG. 5. Subsequently, at time t5, the transfer pulse signals $\phi_{v1}$, $\phi_{v2}$, $\phi_{v3}$ and $\phi_{v4}$ are $V_M$, $V_M$, $V_L$ and $V_L$, respectively, as shown in FIGS. 3A, 3B, 3C and 3D, and as a result, the potential wells are deep as shown by shaded portions at time t5 in FIG. 5. Subsequently, at time t6, the transfer pulse signals $\phi_{v1}$, $\phi_{v2}$, $\phi_{v3}$ and $\phi_{v4}$ are $V_L$, $V_M$, $V_M$ and $V_L$, respectively, as shown in FIGS. 3A, 3B, 3C and 3D, and as a result, the potential wells are deep as shown by shaded portions at time t6 in FIG. 5. Thus, during a time period from t1 to t6, the vertical shift register 2 carries out a one-pixel vertical shift operation, so that the signal charge $Q_A+Q_B$ is transferred to the horizontal output register 3 as shown in FIG. 4D.

Then, the transfer pulse signals $\phi_{H1}$ and $\phi_{H2}$ are changed as shown in FIGS. 3E and 3F, so that the horizontal output register 3 performs a one-horizontal line shift operation upon the signal charge $Q_A+Q_B$ and the like.

Similarly, the transfer pulse signals $\phi_{v1}$, $\phi_{v2}$, $\phi_{v3}$ and $\phi_{v4}$ are changed at times t7, t8, t9 and t10 in the same way as at times t3, t4, t5 and t6 as shown in FIGS. 3A, 3B, 3C and 3D. As a result, the vertical shift register 2 carries out another one-pixel vertical shift operation, so that the signal charge $Q_C+Q_D$ is transferred to the horizontal output register 3. Then, the transfer pulse signals $\phi_{H1}$ and $\phi_{H2}$ are changed as shown in FIGS. 3E and 3F, so that the horizontal output register 3 performs a one-horizontal line shift operation upon the signal charge $Q_C+Q_D$ and the like.

An odd field mode will be explained next with reference to FIGS. 6A through 6F, 7A through 7E, and 8A. In this case, also assume that signal charges $Q_A$, $Q_B$, ..., $Q_H$ are stored in the photo/electro conversion portions 1 denoted by A, B, ..., H as shown in FIG. 7A.

First, at time tA, the transfer pulse signals $\phi_{v1}$, $\phi_{v2}$, $\phi_{v3}$ and $\phi_{v4}$ are $V_L$, $V_M$, $V_H$ and $V_L$, respectively, as shown in FIGS. 6A, 6B, 6C and 6D. As a result, the signal charges $Q_A$, $Q_C$, $Q_E$ and $Q_G$ are read out to the vertical shift register 2 as shown in FIG. 7B.

Next, at time tB, the transfer pulse signals $\phi_{v1}$, $\phi_{v2}$, $\phi_{v3}$ and $\phi_{v4}$ are $V_H$, $V_L$, $V_L$ and $V_M$, respectively, as shown in FIGS. 6A, 6B, 6C and 6D. As a result, the signal charges $Q_B$, $Q_D$, $Q_F$ and $Q_H$ are read out to the vertical shift register 2 as shown in FIG. 7C. In this case, the charges $Q_B$, $Q_D$ and $Q_F$ are added to the charges $Q_C$, $Q_E$ and $Q_G$, respectively, to form signal charges $Q_B+Q_C$, $Q_D+Q_E$ and $Q_F+Q_G$.

Figure 8A:
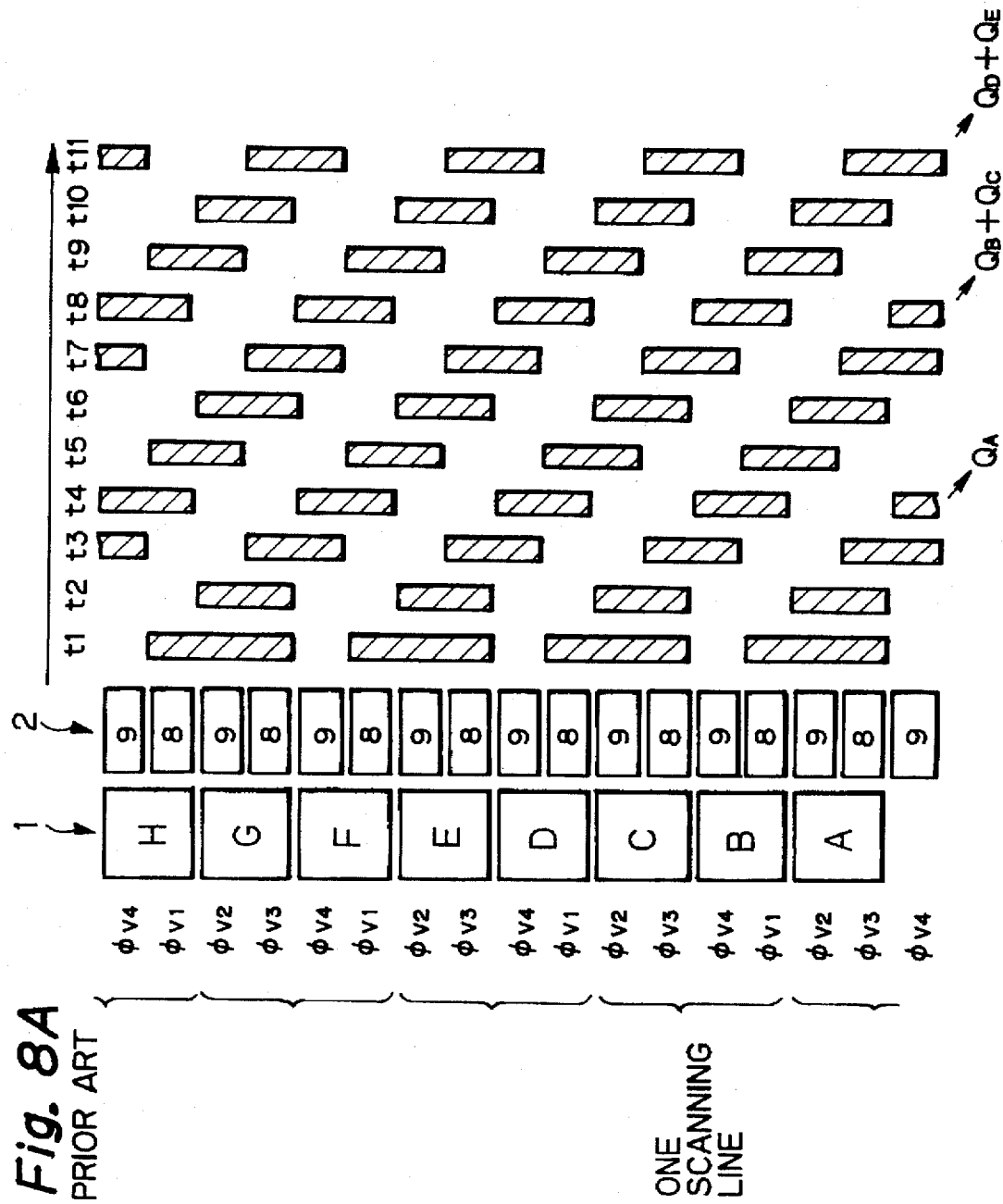
FIG. 8A is a diagram for showing transfer of signal charge in the odd field mode operation of the device of FIG. 1.

Next, at time t1, the transfer pulse signals $\phi_{v1}$, $\phi_{v2}$, $\phi_{v3}$ and $\phi_{v4}$ are $V_M$, $V_M$, $V_M$ and $V_L$, respectively, as shown in FIGS. 6A, 6B, 6C and 6D, and as a result, the potential wells are deep as shown by shaded portions at time t1 in FIG. 8A. Subsequently, at time t2, the transfer pulse signals $\phi_{v1}$, $\phi_{v2}$, $\phi_{v3}$ and $\phi_{v4}$ are $V_L$, $V_M$, $V_M$ and $V_L$, respectively, as shown in FIGS. 6A, 6B, 6C and 6D, and as a result, the potential wells are deep as shown by shaded portions at time t2 in FIG. 8A. Subsequently, at time t3, the transfer pulse signals $\phi_{v1}$, $\phi_{v2}$, $\phi_{v3}$ and $\phi_{v4}$ are $V_L$, $V_L$, $V_M$ and $V_M$, respectively, as shown in FIGS. 6A, 6B, 6C and 6D, and as a result, the potential wells are deep as shown by shaded portions at time t3 in FIG. 8A. Subsequently, at time t4, the transfer pulse signals $\phi_{v1}$, $\phi_{v2}$, $\phi_{v3}$ and $\phi_{v4}$ are $V_M$, $V_L$, $V_L$ and $V_M$, respectively, as shown in FIGS. 6A, 6B, 6C and 6D, and as a result, the potential wells are deep as shown by shaded portions at time t4 in FIG. 8A. Subsequently, at time t5, the transfer pulse signals $\phi_{v1}$, $\phi_{v2}$, $\phi_{v3}$ and $\phi_{v4}$ are $V_M$, $V_M$, $V_L$ and $V_L$, respectively, as shown in FIGS. 6A, 6B, 6C and 6D, and as a result, the potential wells are deep as shown by shaded portions at time t5 in FIG. 8A. Subsequently, at time t6, the transfer pulse signals $\phi_{v1}$, $\phi_{v2}$, $\phi_{v3}$ and $\phi_{v4}$ are $V_L$, $V_M$, $V_M$ and $V_L$, respectively, as shown in FIGS. 6A, 6B, 6C and 6D, and as a result, the potential wells are deep as shown by shaded portions at time t6 in FIG. 8A. Thus, during a time period from t1 to t6, the vertical shift register 2 carries out a one-pixel vertical shift operation, so that the signal charge $Q_A$ is transferred to the horizontal output register 3 as shown in FIG. 7D.

Then, the transfer pulse signals $\phi_{H1}$ and $\phi_{H2}$ are changed as shown in FIGS. 6E and 6F, so that the horizontal output register 3 performs a one-horizontal line shift operation upon the signal charge $Q_A$ and the like.

Similarly, the transfer pulse signals $\phi_{v1}$, $\phi_{v2}$, $\phi_{v3}$ and $\phi_{v4}$ are changed at times t7, t8, t9 and t10 in the same way as at times t3, t4, t5 and t6 as shown in FIGS. 6A, 6B, 6C and 6D. As a result, the vertical shift register 2 carries out another one-pixel vertical shift operation, so that the signal charge $Q_B+Q_C$ is transferred to the horizontal output register 3 as shown in FIG. 7E. Then, the transfer pulse signals $\phi_{H1}$ and $\phi_{H2}$ are changed as shown in FIGS. 6E and 6F, so that the horizontal output register 3 performs a one-horizontal line shift operation upon the signal charge $Q_B+Q_C$ and the like.

Then, in the device of FIG. 1, since the resolution in the vertical direction depends upon the number of effective scanning lines in a TV format, signal charges of very two photo/electro conversion portions (photo diodes) are mixed to generate one horizontal line signal.

In the device of FIG. 1, however, when the density of the pixels in the horizontal direction is increased to enhance the resolution, the width of the vertical shift registers 2 is reduced. As a result, the ratio of a width W to a length L of the transfer electrodes 8 and 9 is reduced. Therefore, the electric field within the vertical shift registers 2 along the vertical shift direction is reduced, and accordingly, the efficiency of charge transfer deteriorates.

Figure 8B:
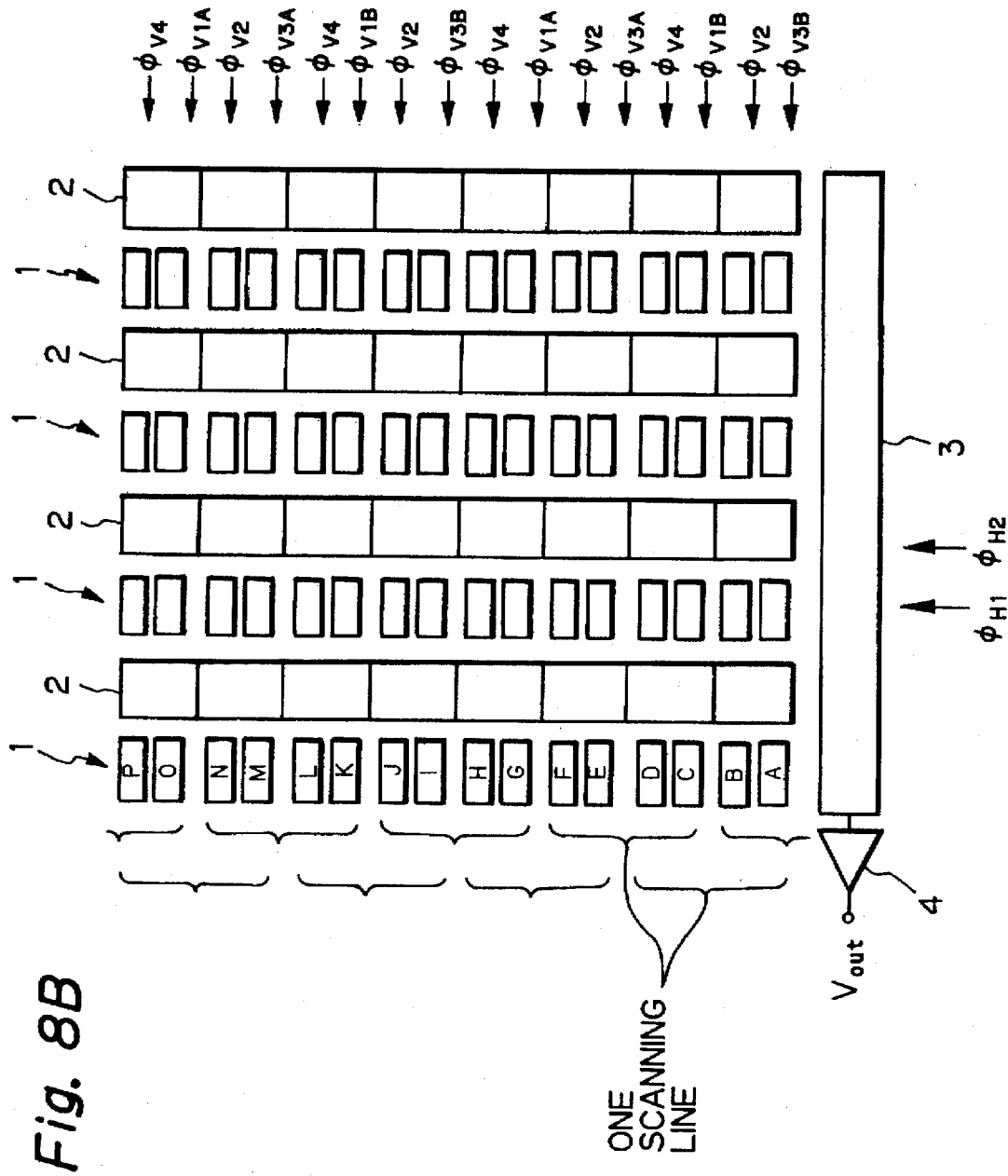
FIG. 8B is a plan view illustrating a first embodiment of the CCD type solid state image pickup device according to the present invention.
Figure 9:
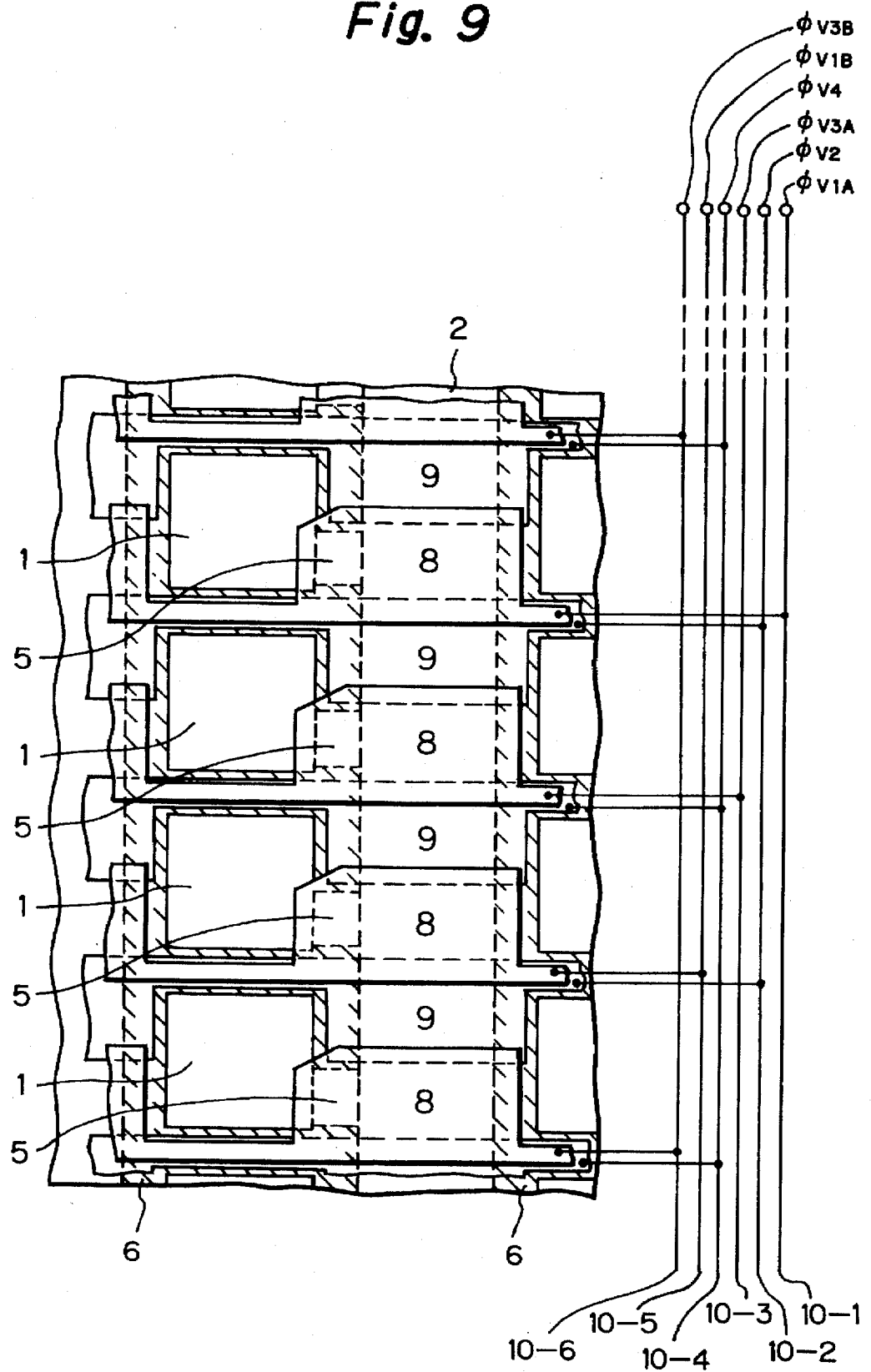
FIG. 9 is a partially enlarged plan view of the device of FIG. 8B.

In FIG. 8B, which illustrates a first embodiment of the present invention, every four of the photo/electro conversion portions 1 form one scanning line. In this case, the vertical shift registers 2 may be operated by eight-phase transfer pulse signals; however, the vertical shift registers 2 are operated by six-phase transfer pulse signals $\phi_{v1A}$, $\phi_{v2}$, $\phi_{v3A}$, $\phi_{v4}$, $\phi_{v1B}$ and $\phi_{v3B}$. Therefore, as illustrated in FIG. 9, six bus lines 10-1, 10-2, 10-3, 10-4, 10-5 and 10-6 made of aluminum are provided and connected to the transfer electrodes 8 and 9. The transfer pulse signals $\phi_{v1A}$, $\phi_{v2}$, $\phi_{v3A}$, $\phi_{v4}$, $\phi_{v1B}$ and $\phi_{v3B}$ are supplied to the bus lines 10-1, 10-2, 10-3, 10-4, 10-5 and 10-6, respectively.

The operation of the device of FIG. 8B is by interlaced scanning.

An even field mode will now be explained with reference to FIGS. 10A through 10J, and 11. In this case, assume that signal charges $Q_A$, $Q_B$, ..., $Q_H$ are stored in the photo/electro conversion portions 1 denoted by A, B, ..., H as shown in FIG. 11A.

First, at time t1, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$ and $\phi_{v4}$ are $V_M$, $V_M$, $V_H$, $V_L$, $V_M$, $V_M$, $V_H$ and $V_L$, respectively, as shown in FIGS. 10A through 10H. As a result, the signal charges $Q_A$, $Q_B$, $Q_C$, $Q_D$, $Q_E$, $Q_F$, $Q_G$ and $Q_H$ are read out to the vertical shift register 2. In this case, since the transfer pulse signal $\phi_{v4}$ is $V_L$, the potential wells are deep as shown by shaded portions at time t1 in FIG. 11, the signal charges $Q_B$, $Q_D$, and $Q_F$ never mix with the signal charges $Q_C$, $Q_E$ and $Q_G$, respectively.

Next, at time t2, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$ and $\phi_{v4}$ are $V_M$, $V_M$, $V_M$, $V_L$, $V_M$, $V_M$, $V_M$ and $V_L$, respectively, as shown in FIGS. 10A through 10H. As a result, the potential wells are deep as shown by shaded portions at time t2 in FIG. 11, the charges $Q_B$, $Q_D$, $Q_F$ and $Q_H$ are added to the charges $Q_A$, $Q_C$, $Q_E$ and $Q_G$, respectively, to form signal charges $Q_A+Q_B$, $Q_C+Q_D$, $Q_E+Q_F$ and $Q_G+Q_H$.

Next, at time t3, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$ and $\phi_{v4}$ are $V_L$, $V_M$, $V_M$, $V_L$, $V_L$, $V_M$, $V_M$ and $V_L$, respectively, as shown in FIGS. 10A through 10H.

As a result, the potential wells are deep as shown by shaded portions at time t3 in FIG. 11. Subsequently, at time t4, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$, and $\phi_{v4}$ are $V_L$, $V_L$, $V_M$, $V_M$, $V_L$, $V_L$, $V_M$ and $V_M$, respectively, as shown in FIGS. 10A through 10H. As a result, the potential wells are deep as shown by shaded portions at time t4 in FIG. 11. Subsequently, at time t5, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$ and $\phi_{v4}$ are $V_M$, $V_L$, $V_L$, $V_M$, $V_M$, $V_L$, $V_L$ and $V_M$, respectively, as shown in FIGS. 10A through 10H. As a result, the potential wells are deep as shown by shaded portions at time t5 in FIG. 11. Subsequently, at time t6, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$ and $\phi_{v4}$ are $V_M$, $V_M$, $V_L$, $V_L$, $V_M$, $V_M$, $V_L$ and $V_L$, respectively, as shown in FIGS. 10A through 10H. As a result, the potential wells are deep as shown by shaded portions at time t6 in FIG. 11. Subsequently, at time t7, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$ and $\phi_{v4}$ are $V_L$, $V_M$, $V_M$, $V_L$, $V_L$, $V_M$, $V_M$ and $V_L$, respectively, as shown in FIGS. 10A through 10H. As a result, the potential wells are deep as shown by shaded portions at time t7 in FIG. 11. Subsequently, at time t8, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$ and $\phi_{v4}$ are $V_L$, $V_L$, $V_M$, $V_M$, $V_L$, $V_L$, $V_M$ and $V_M$, respectively, as shown in FIGS. 10A through 10H. As a result, the potential wells are deep as shown by shaded portions at time t8 in FIG. 11. In this state, the signal charge $Q_A+Q_B$ is completely transferred to the horizontal output register 3.

Similarly, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$ and $\phi_{v4}$ are changed at times t9, t10, t11 and t12 in the same way as at times t5, t6, t7 and t8 as shown in FIGS. 10A through 10H. As a result, the signal charge $Q_C+Q_D$ is also completely transferred to the horizontal output register 3. Therefore, the signal charge $Q_C+Q_D$ is added to the signal charge $Q_A+Q_B$ in the horizontal output register 3.

Thus, in the horizontal output register 3, a signal charge $Q_A+Q_B+Q_C+Q_D$ is formed.

Figure 10:
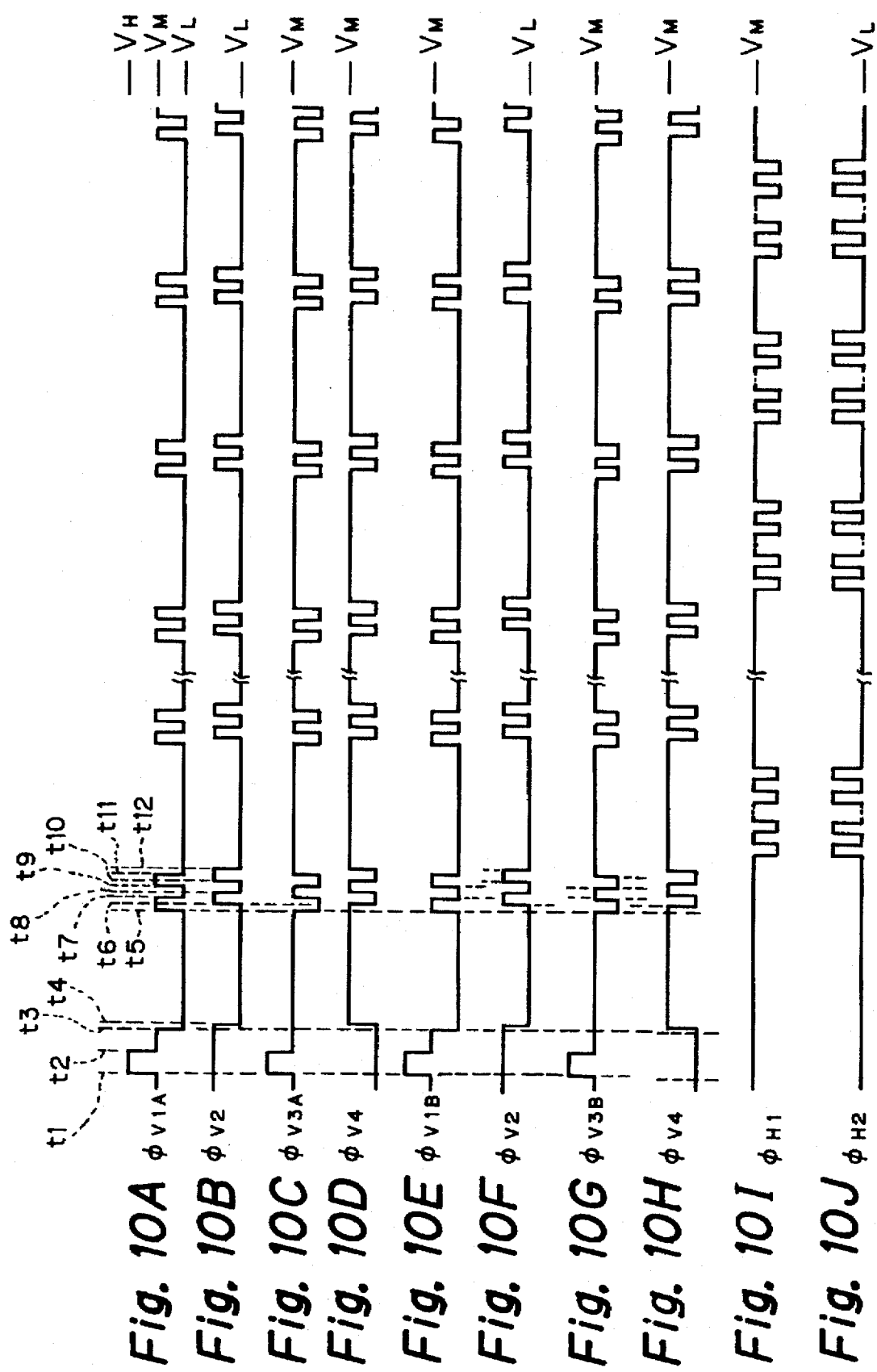
FIGS. 10A through 10J are timing diagrams for explaining an even field mode operation of the device of FIG. 8B.
Figure 11:
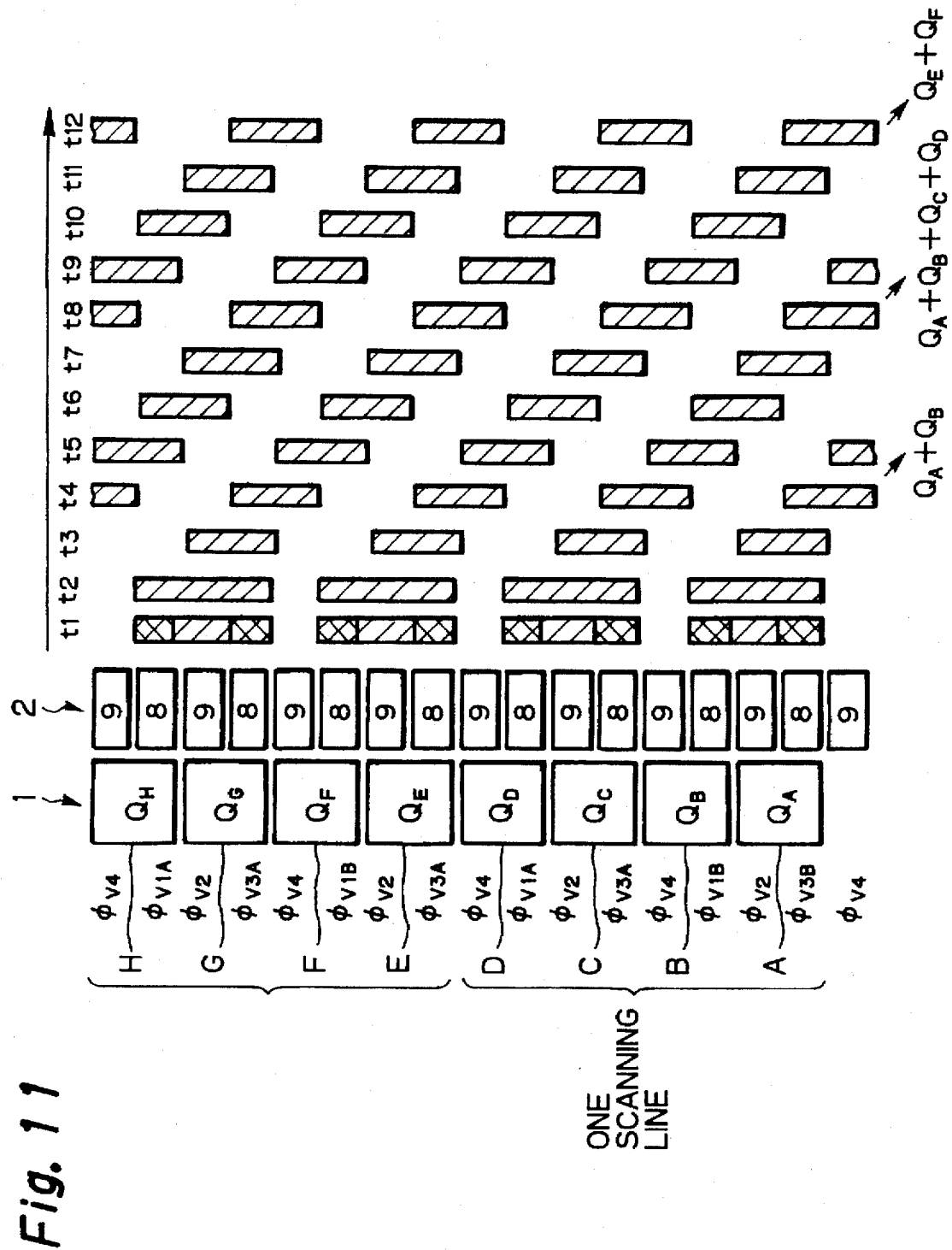
FIG. 11 is a diagram for showing transfer of signal charge in the even field mode operation of the device of FIG. 8B.

Then, the transfer pulse signals $\phi_{H1}$ and $\phi_{H2}$ are changed as shown in FIGS. 10I and 10J, so that the horizontal output register 3 performs a one-horizontal line shift operation upon the signal charge $Q_A+Q_B+Q_C+Q_D$ and the like.

An odd field mode will be explained next with reference to FIGS. 12A through 12J and 13. In this case, assume that signal charges $Q_A$, $Q_B$, ..., $Q_H$ are stored in the photo/electro conversion portions 1 denoted by A, B, ..., H as shown in FIG. 13.

As shown in FIGS. 12A through 12H, from time t1 to time t8, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$ and $\phi_{v4}$ are changed in the same way as in FIGS. 10A through 10H. Therefore, the signal change $Q_A+Q_B$ is completely transferred to the horizontal output register 3 as shown in FIG. 13.

Figure 12:
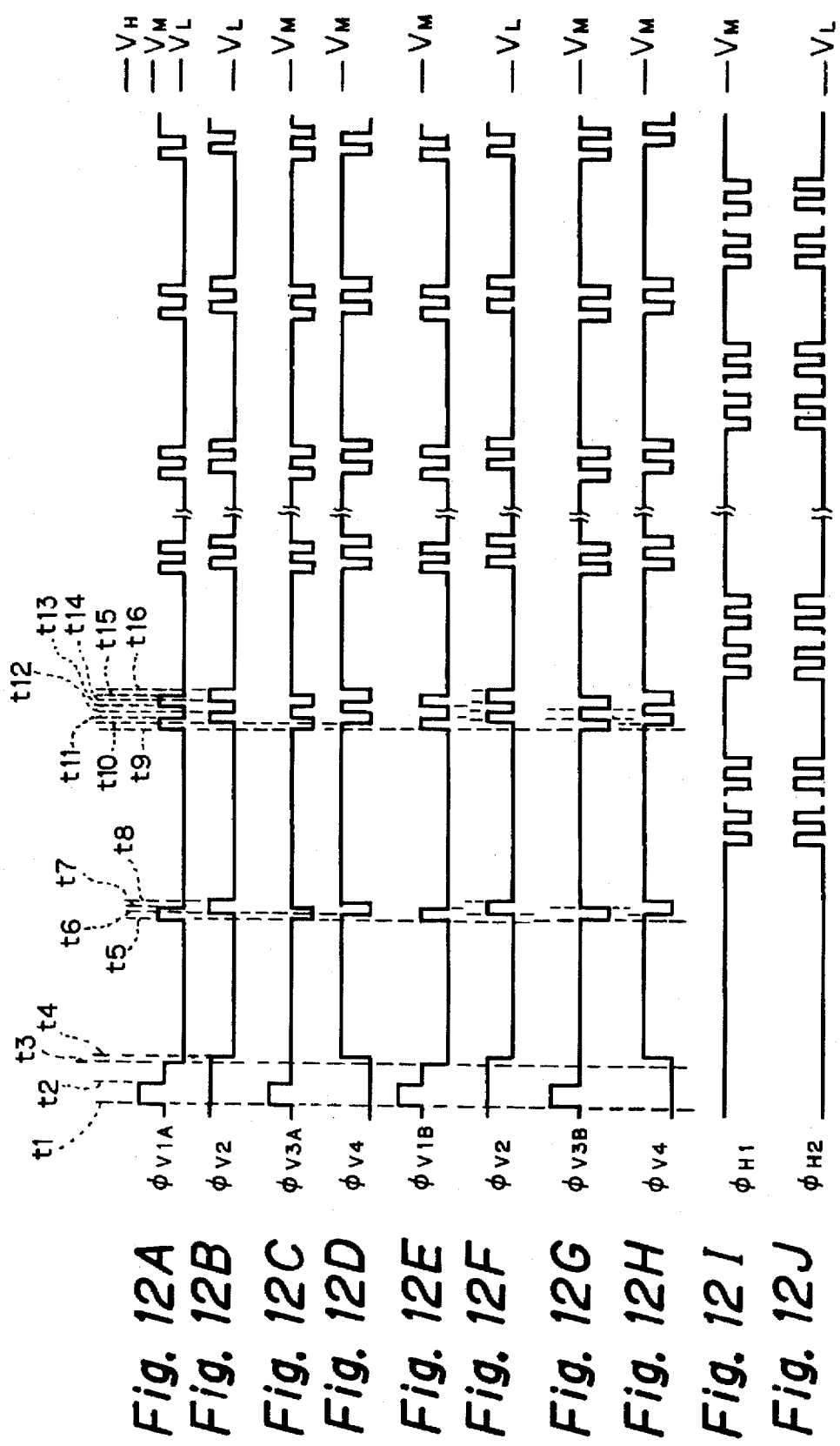
FIGS. 12A through 12J are timing diagrams for explaining an odd field mode operation of the device of FIG. 8B.
Figure 13:
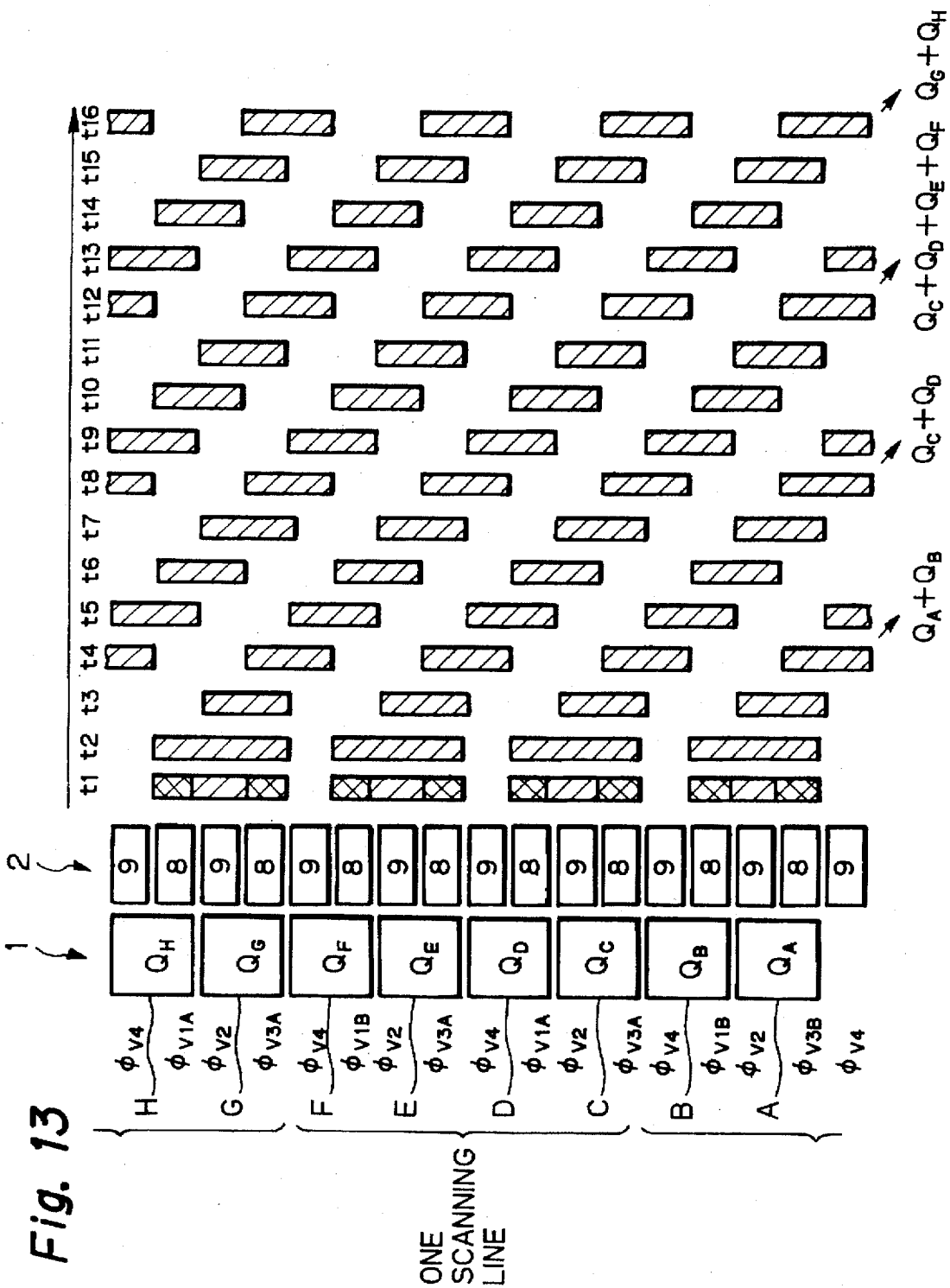
FIG. 13 is a diagram for showing transfer of signal charge in the odd field mode operation of the device of FIG. 8B.

Then, the transfer pulse signals $\phi_{H1}$ and $\phi_{H2}$ are changed as shown in FIGS. 12I and 12J, so that the horizontal output register 3 performs a one-horizontal line shift operation upon the signal charge $Q_A+Q_B$ and the like.

Then, at times t9, t10, t11 and t12, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$ and $\phi_{v4}$ are changed in the same way as at times t5, t6, t7 and t8 as shown in FIGS. 12A through 12H. As a result, the signal charge $Q_C+Q_D$ is completely transferred to the horizontal output register 3 as shown in FIG. 13.

Then, at times t13, t14, t15 and t16, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$ and $\phi_{v4}$ are changed in the same way as at times t5, t6, t7 and t8 as shown in FIGS. 12A through 12H. As a result, the signal charge $Q_E+Q_F$ is also completely transferred to the horizontal output register 3 as shown in FIG. 13. Therefore, the signal charge $Q_E+Q_F$ is added to the signal charge $Q_C+Q_D$ in the horizontal output register 3.

Thus, in the horizontal output register 3, a signal charge $Q_C+Q_D+Q_E+Q_F$ is formed.

Then, the transfer pulse signals $\phi_{H1}$ and $\phi_{H2}$ are changed as shown in FIGS. 12I and 12J, so that the horizontal output register 3 performs a one-horizontal line shift operation upon the signal charge $Q_C+Q_D+Q_E+Q_F$ and the like.

In the above-described first embodiment, the horizontal output register 3 is designed to process every four rows of the photo/electro conversion portions 1, in other words, the width of the horizontal output register 3 is twice that of the prior art. Note that the requirement of size of the horizontal output register 3 is less than that of the vertical shift registers 2. Thus, in the first embodiment, the ratio of a width W to a length L of the transfer electrodes 8 and 9 can be twice that of the prior art. Therefore, the electric field within the vertical shift register 2 along the vertical shift direction can be twice that of the prior art, and accordingly, the efficiency of charge transfer can be enhanced.

Figure 14:
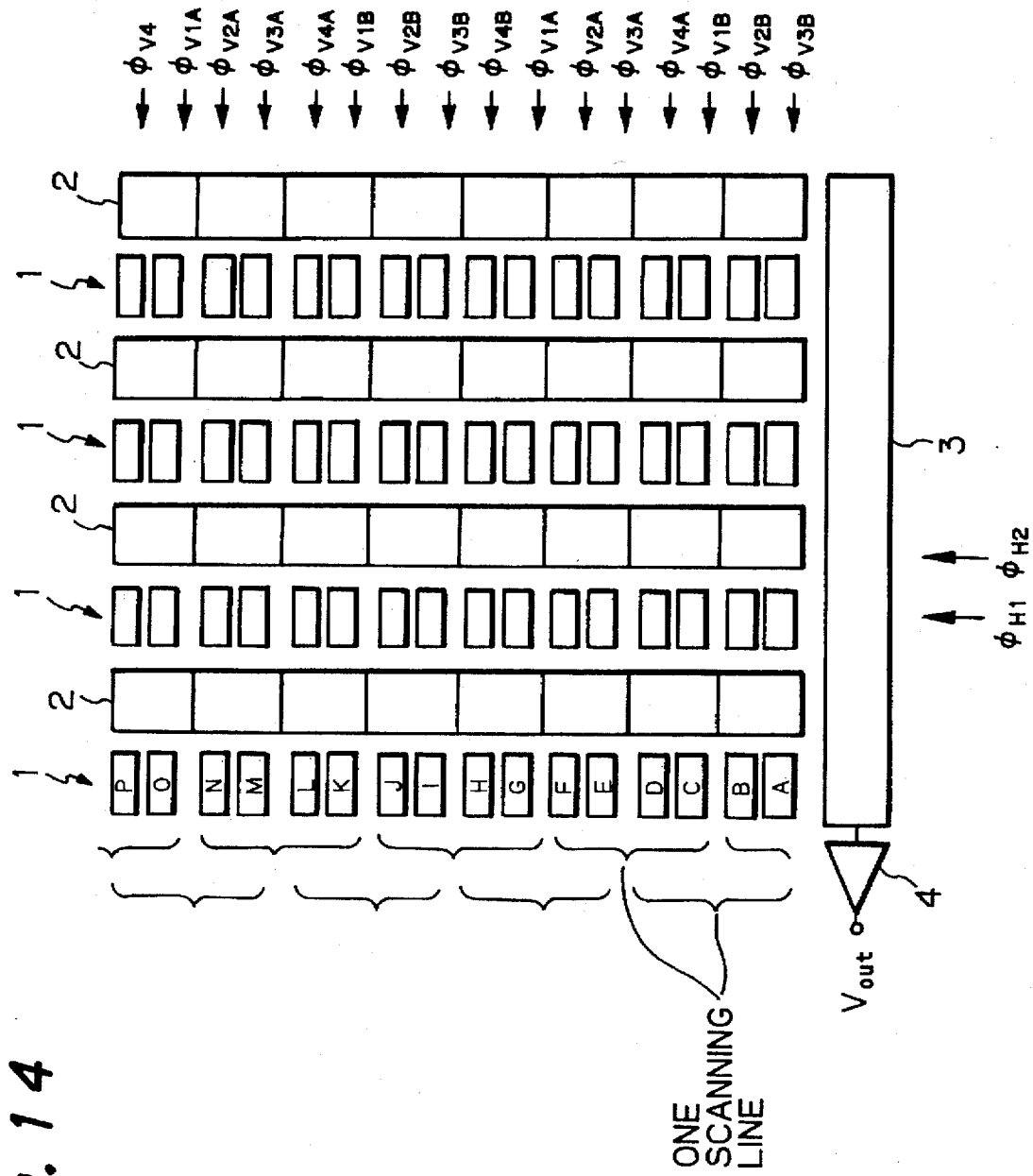
FIG. 14 is a plan view illustrating a second embodiment of the CCD type solid state image pickup device according to the present invention.
Figure 15:
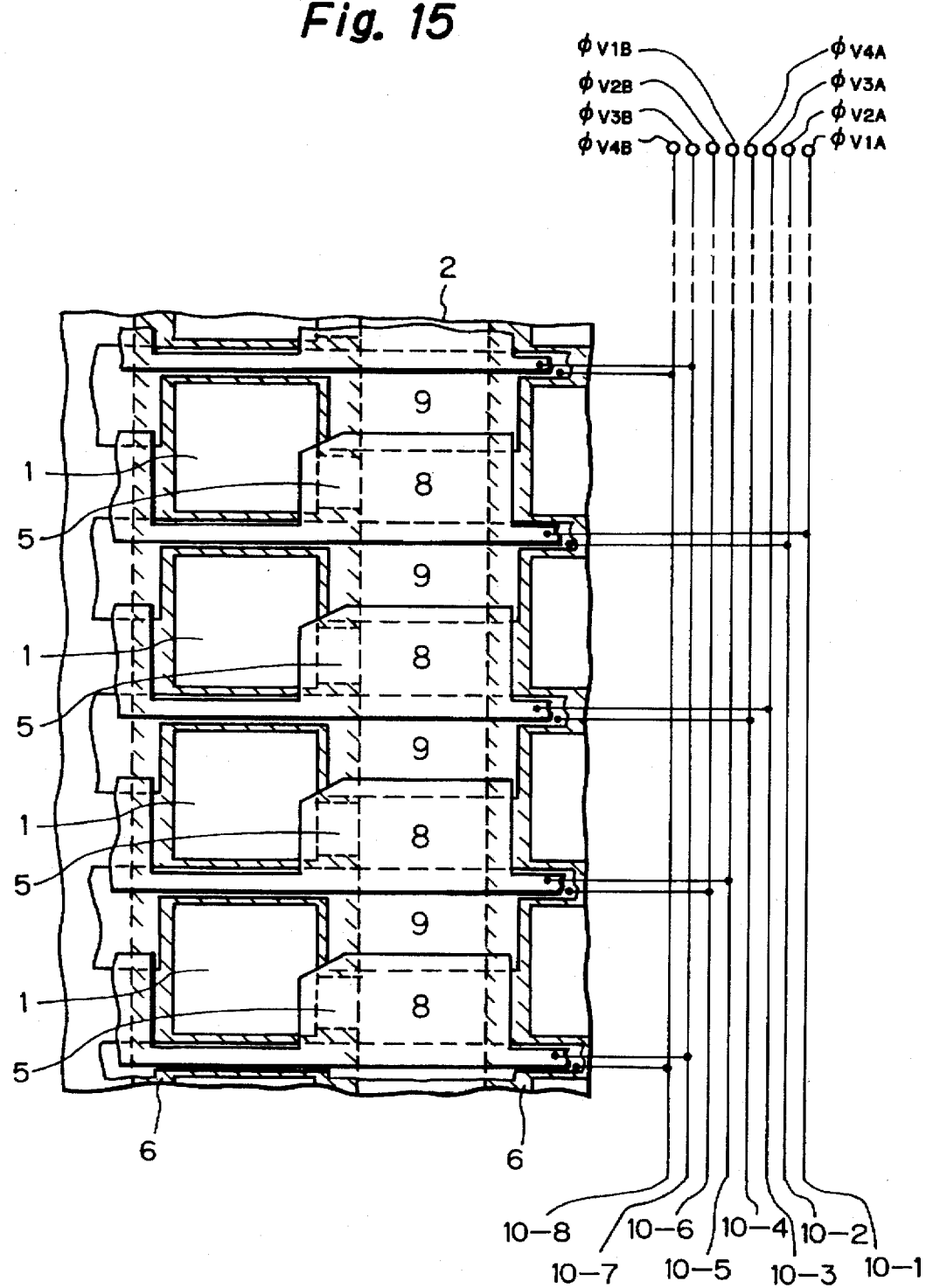
FIG. 15 is a partially enlarged plan view of the device of FIG. 14.

In FIG. 14, which illustrates a second embodiment of the present invention, every four of the photo/electro conversion portions 1 form one scanning line. In this second embodiment, the vertical shift register 2 are operated by eight-phase transfer pulse signals $\phi_{v1A}$, $\phi_{v2A}$, $\phi_{v3A}$, $\phi_{v4A}$, $\phi_{v1B}$, $\phi_{v2B}$, $\phi_{v3B}$ and $\phi_{v4B}$. Therefore, as illustrated in FIG. 15, eight bus lines 10-1, 10-2, 10-3, 10-4, 10-5, 10-6, 10-7 and 10-8 made of aluminum are provided and connected to the transfer electrode 8 and 9. The transfer pulse signals $\phi_{v1A}$, $\phi_{v2A}$, $\phi_{v3A}$, $\phi_{v4A}$, $\phi_{v1B}$, $\phi_{v2B}$, $\phi_{v3B}$ and $\phi_{v4B}$ are supplied to the bus lines 10-1, 10-2, 10-3, 10-4, 10-5, 10-6, 10-7 and 10-8 respectively.

The operation of the device of FIG. 14 is by interlaced scanning.

An even field mode will now be explained with reference to FIGS. 16A through 16J, and 17. In this case, assume that signal charges $Q_A$, $Q_B$, ..., $Q_H$ are stored in the photo/electro conversion portions 1 denoted by A, B, ..., H as shown in FIG. 17.

First, at time t1, the transfer pulse signals $\phi_{v1A}$, $\phi_{v2}$, $\phi_{v3A}$, $\phi_{v4A}$, $\phi_{v1B}$, $\phi_{v2B}$, $\phi_{v3B}$ and $\phi_{v4B}$ are $V_H$, $V_M$, $V_H$, $V_M$, $V_M$, $V_M$, $V_M$ and $V_L$, respectively, as shown in FIGS. 16A through 16H. As a result, the signal charges $Q_A$, $Q_B$, $Q_C$, $Q_D$, $Q_E$, $Q_F$, $Q_G$ and $Q_H$ are read out to the vertical shift register 2. In this case, since the transfer pulse signal $\phi_{v4B}$ is $V_L$, the potential wells are deep as shown by shaded portions at time t1 in FIG. 17, the signal charges $Q_A$, $Q_B$, $Q_C$ and $Q_D$ never mix with the signal charges $Q_E$, $Q_F$, $Q_G$ and $Q_H$.

Next, at time t2, the transfer pulse signals $\phi_{v1A}$, $\phi_{v2}$, $\phi_{v3A}$, $\phi_{v4}$, $\phi_{v1B}$, $\phi_{v2}$, $\phi_{v3B}$ and $\phi_{v4}$ are $V_M$, $V_M$, $V_M$, $V_M$, $V_M$, $V_M$, $V_M$ and $V_L$, respectively, as shown in FIGS. 16A through 16H. As a result, the potential wells are deep as shown by shaded portions at time t2 in FIG. 17, the charges $Q_A$, $Q_B$, $Q_C$ and $Q_D$ are combined to generate a signal charge $Q_A+Q_B+Q_C+Q_D$ in the vertical shift register 2, and the charges $Q_E$, $Q_F$, $Q_G$ and $Q_H$ are combined to generate a signal charge $Q_E+Q_F+Q_G+Q_H$.

Next, at time t3, the transfer pulse signals $\phi_{v1A}$, $\phi_{v2A}$, $\phi_{v3A}$, $\phi_{v4A}$, $\phi_{v1B}$, $\phi_{v2B}$, $\phi_{v3B}$ and $\phi_{v4B}$ are $V_M$, $V_M$, $V_M$, $V_M$, $V_M$, $V_M$, $V_L$ and $V_L$, respectively, as shown in FIGS. 16A through 16H. As a result, the potential wells are deep as shown by shaded portions at time t3 in FIG. 17. Subsequently, at time t4, the transfer pulse signals $\phi_{v1A}$, $\phi_{v2A}$, $\phi_{v3A}$, $\phi_{v4A}$, $\phi_{v1B}$, $\phi_{v2B}$, $\phi_{v3B}$ and $\phi_{v4B}$ are $V_M$, $V_M$, $V_M$, $V_M$, $V_M$, $V_M$, $V_M$ and $V_L$, respectively, as shown in FIGS. 16A through 16H. As a result, the potential wells are deep as shown by shaded portions at time t4 in FIG. 17. Subsequently, at time t5, the transfer pulse signals $\phi_{v1A}$, $\phi_{v2}$, $\phi_{v3A}$, $\phi_{v4A}$, $\phi_{v1B}$, $\phi_{v2B}$, $\phi_{v3B}$ and $\phi_{v4B}$ are $V_L$, $V_M$, $V_M$, $V_M$, $V_M$, $V_M$, $V_M$ and $V_L$, respectively, as shown in FIGS. 16A through 16H. As a result, the potential wells are deep as shown by shaded portions at time t5 in FIG. 17. Thus, at times t3, t4 and t5, the vertical shift register 2 performs a one-pixel vertical shift operation upon the signal charge $Q_A+Q_B+Q_C+Q_D$, the signal charge $Q_E+Q_F+Q_G+Q_H$, ....

Similarly, the transfer pulse signals $\phi_{v1A}$, $\phi_{v2A}$, $\phi_{v3A}$, $\phi_{v4A}$, $\phi_{v1B}$, $\phi_{v2B}$, $\phi_{v3B}$ and $\phi_{v4B}$ are changed at times t6 and t7, time t8 and t9, times t10 and t11, times t12 and t13, times t14 and t15, t16 and t17, and times t18 and t19, in a similar way to times t4 and t5. As a result, the signal charge $Q_A+Q_B+Q_C+Q_D$ is completely transferred to the horizontal output register 3.

Figure 16:
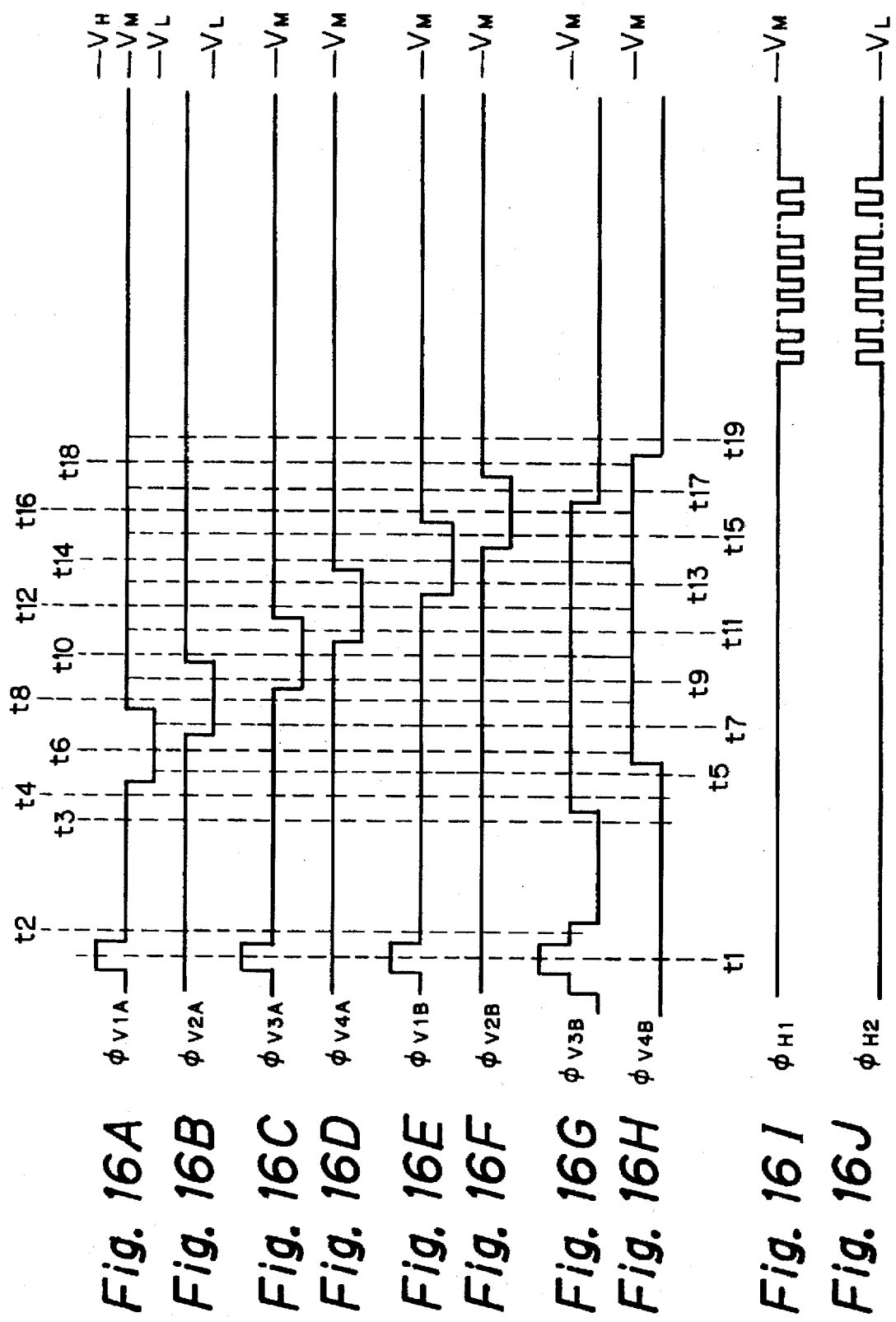
FIGS. 16A through 16J are timing diagrams for explaining an even field mode operation of the device of FIG. 14.
Figure 17:
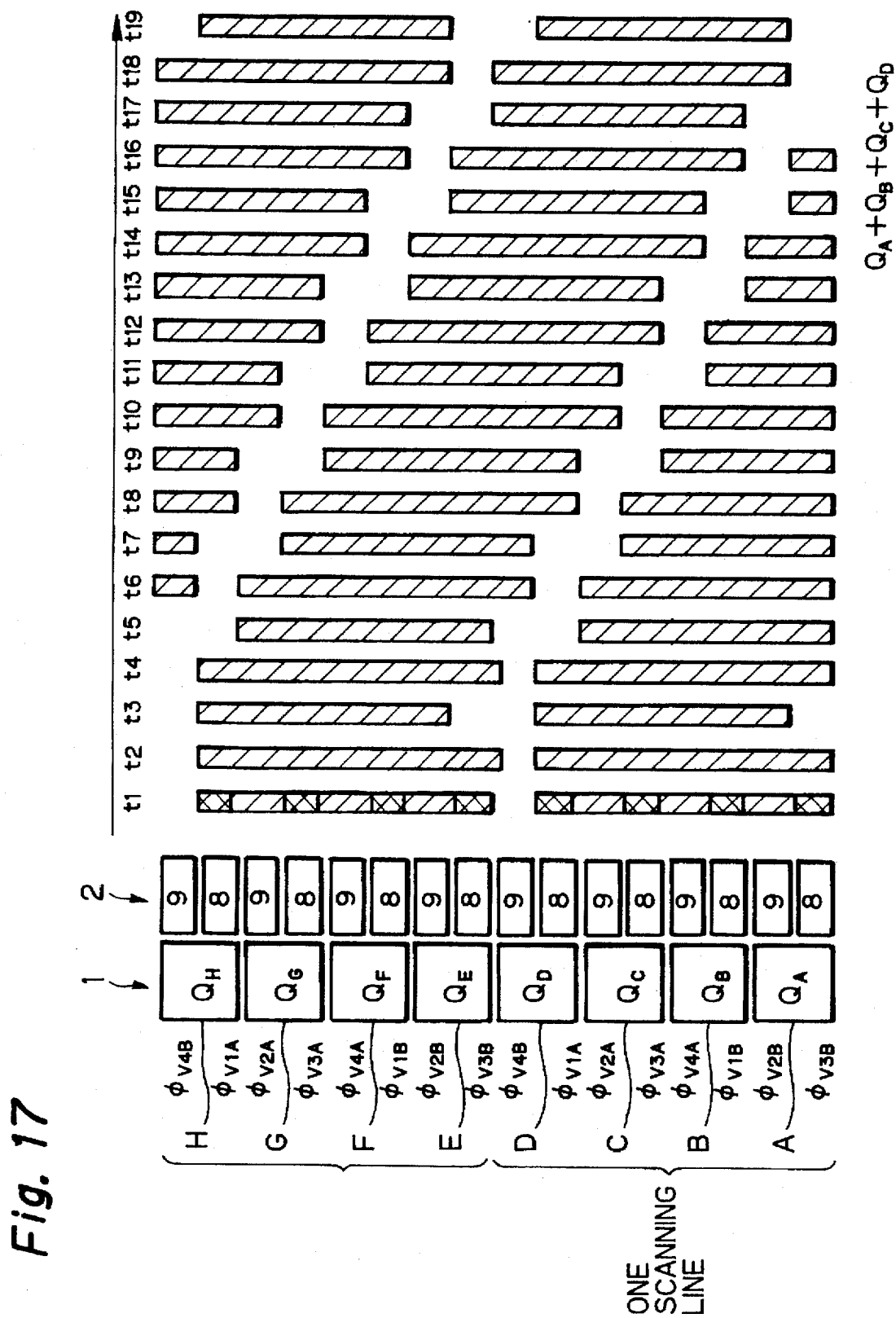
FIG. 17 is a diagram for showing transfer of signal charge in the even field mode operation of the device of FIG. 14.

Then, the transfer pulse signals $\phi_{H1}$ and $\phi_{H2}$ are changed as shown in FIGS. 16I and 16J, so that the horizontal output register 3 performs a one-horizontal line shift operation upon the signal charge $Q_A+Q_B+Q_C+Q_D$ and the like.

An odd field mode will be explained next with reference to FIGS. 18A through 18J, and 19. In this case, assume that signal charges $Q_A$, $Q_B$, ..., $Q_H$ are stored in the photo/electro conversion portions 1 denoted by A, B, ..., H as shown in FIG. 19.

First, at time t1, the transfer pulse signals $\phi_{v1A}$, $\phi_{v2}$, $\phi_{v3A}$, $\phi_{v4A}$, $\phi_{v1B}$, $\phi_{v2B}$, $\phi_{v3B}$, $\phi_{v2B}$, $\phi_{v3B}$ and $\phi_{v4B}$ are $V_M$, $V_M$, $V_H$, $V_L$, $V_M$, $V_M$, $V_H$ and $V_M$, respectively, as shown in FIGS. 18A through 18H. As a result, the signal charges $Q_A$, $Q_B$, $Q_C$, $Q_D$, $Q_E$, $Q_F$, $Q_G$ and $Q_H$ are read out to the vertical shift register 2. In this case, since the transfer pulse signal $\phi_{v4A}$ is $V_L$, the potential wells are deep as shown by shaded portions at time t1 in FIG. 19, the signal charges $Q_A$ and $Q_B$, $Q_G$ and $Q_H$ never mix with the signal charges $Q_C$, $Q_D$, $Q_E$ and $Q_F$.

Next, at time t3, the transfer pulse signals $\phi_{v1A}$, $\phi_{v2A}$, $\phi_{v3A}$, $\phi_{v4A}$, $\phi_{v1B}$, $\phi_{v2B}$, $\phi_{v3B}$ and $\phi_{v4B}$ are $V_M$, $V_M$, $V_L$, $V_L$, $V_M$, $V_M$, $V_M$ and $V_M$, respectively, as shown in FIGS. 18A through 18H. As a result, the potential wells are deep as shown by shaded portions at time t3 in FIG. 19. Subsequently, at time t4, the transfer pulse signals $\phi_{v1A}$, $\phi_{v2A}$, $\phi_{v3A}$, $\phi_{v4A}$, $\phi_{v1B}$, $\phi_{v2B}$, $\phi_{v3B}$ and $\phi_{v4B}$ are $V_M$, $V_M$, $V_L$, $V_M$, $V_M$, $V_M$, $V_M$ and $V_M$, respectively, as shown in FIGS. 18A through 18H. As a result, the potential wells are deep as shown by shaded portions at time t4 in FIG. 19. Subsequently, at time t5, the transfer pulse signals $\phi_{v1A}$, $\phi_{v2}$, $\phi_{v3A}$, $\phi_{v4A}$, $\phi_{v1B}$, $\phi_{v2B}$, $\phi_{v3B}$ and $\phi_{v4B}$ are $V_M$, $V_M$, $V_M$, $V_L$, $V_L$, $V_M$, $V_M$ and $V_M$, respectively, as shown in FIGS. 18A through 18H. As a result, the potential wells are deep as shown by shaded portions at time t5 in FIG. 19. Thus, at times t3, t4 and t5, the vertical shift register 2 performs a one-pixel vertical shift operation upon the signal charge $Q_A+Q_B$, the signal charge $Q_C+Q_D+Q_E+Q_F$, ....

Similarly, the transfer pulse signals $\phi_{v1A}$, $\phi_{v2A}$, $\phi_{v3A}$, $\phi_{v4A}$, $\phi_{v1B}$, $\phi_{v2B}$, $\phi_{v3B}$ and $\phi_{v4B}$ are changed to times t6 and t7, time t8 and t9, and times t10, in a similar way to times t4 and t5. As a result, the signal charge $Q_A+Q_B$ is completely transferred to the horizontal output register 3.

Figure 18:
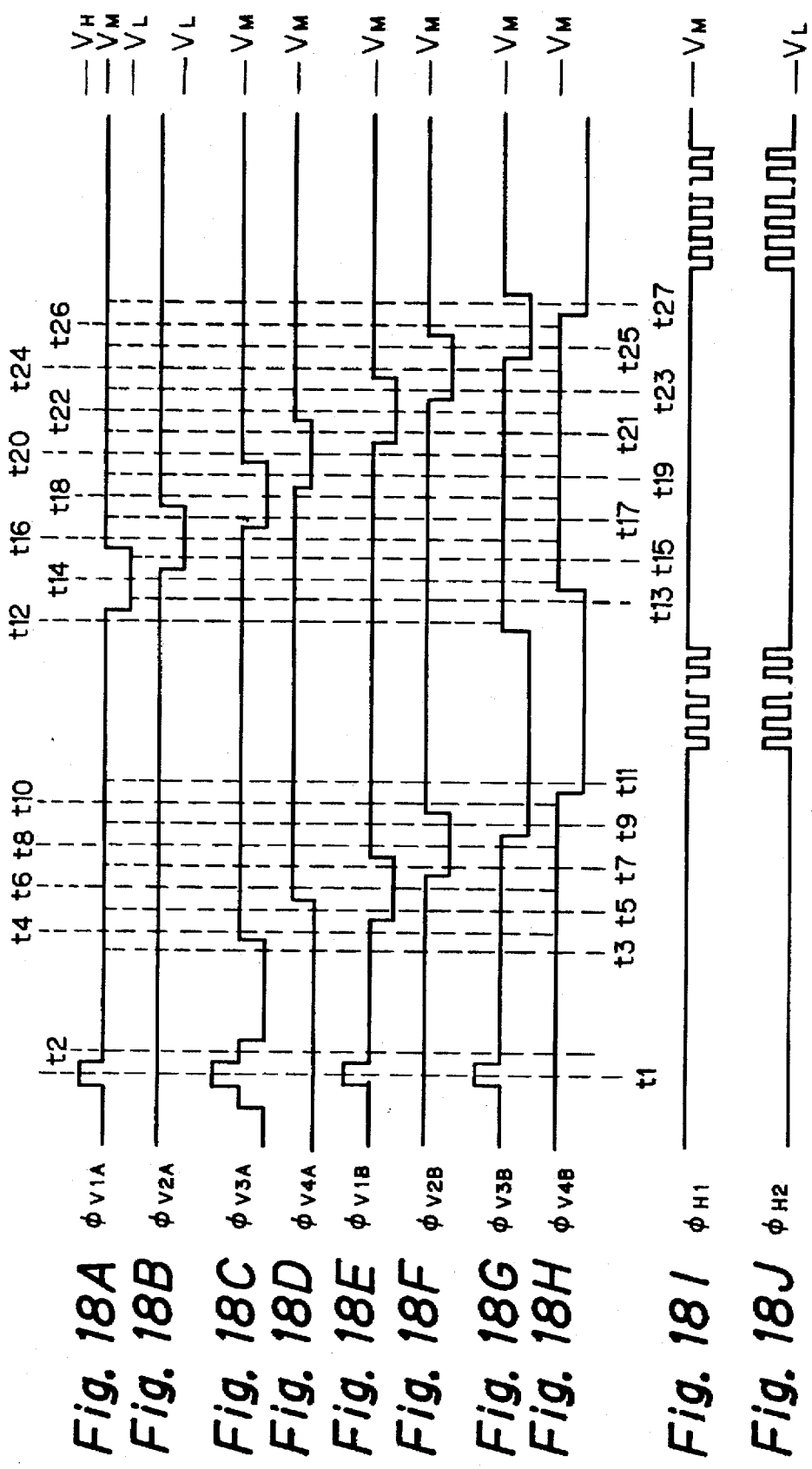
FIGS. 18A through 18J are timing diagrams for explaining an odd field mode operation of the device of FIG. 14.
Figure 19:
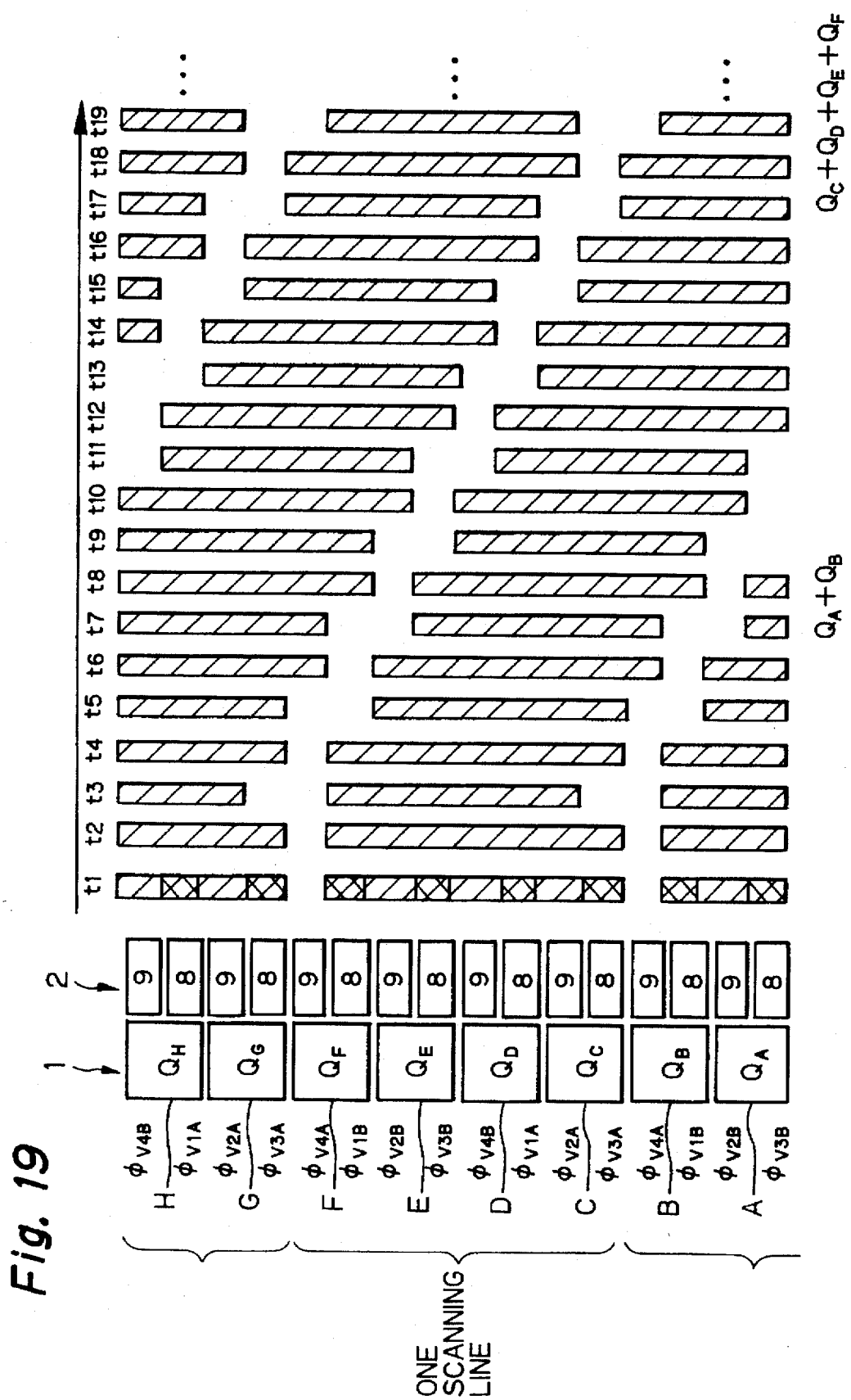
FIG. 19 is a diagram for showing transfer of signal charge in the odd field mode operation of the device of FIG. 14.

Then, the transfer pulse signals $\phi_{H1}$ and $\phi_{H2}$ are changed as shown in FIGS. 18I and 18J, so that the horizontal output register 3 performs a one-horizontal line shift operation upon the signal charge $Q_A+Q_B$ and the like.

Next, the transfer pulse signals $\phi_{v1A}$, $\phi_{v2A}$, $\phi_{v3A}$, $\phi_{v4A}$, $\phi_{v1B}$, $\phi_{v2B}$, $\phi_{v3B}$ and $\phi_{v4B}$ are changed at times t12 and t13, t14 and t15, t16 and t17, t18 and t19, t20 and t21, t22 and t23, t24 and t25, and t26 and t27, in a similar way to times t4 and t5. As a result, the signal charge $Q_C+Q_D+Q_E+Q_F$ is completely transferred to the horizontal output register 3. Then, the transfer pulse signals $\phi_{H1}$ and $\phi_{H2}$ are changed as shown in FIGS. 18I and 18J, so that the horizontal output register 3 performs a one-horizontal line shift operation upon the signal charge $Q_C+Q_D+Q_E+Q_F$ and the like.

Also, in the above-described second embodiment, the horizontal output register 3 is designed to process every four rows of the photo/electro conversion portions 1, in other words, the width of the horizontal output register 3 is twice that of the prior art.

Thus, in the second embodiment, the ratio of a width W to a length L of the transfer electrodes 8 and 9 can be twice that of the prior art. Therefore, the electric field within the vertical shift registers 2 along the vertical shift direction can be twice that of the prior art, and accordingly, the efficiency of charge transfer can be enhanced.

Further, in the first embodiment, the signal charge such as $Q_A+Q_B+Q_C+Q_D$ is stored in the potential wells beneath four transfer electrodes within the vertical shift register 2 during a vertical shift operation. On the other hand, in the second embodiment, the signal charges such as $Q_A+Q_B+Q_C+Q_D$ are stored in the potential wells beneath six or seven transfer electrodes within the vertical shift register 2 during a vertical shift operation. Therefore, the amount of the signal charge in the second embodiment can be about one and half times as large as the amount of the signal charge in the first embodiment as well as in the prior art. Therefore, in the second embodiment, register blooming can be avoided to broaden the dynamic range.

As explained hereinabove, according to the present invention, since the ratio of width to length of the transfer electrodes of the vertical shift registers can be increased, the efficiency of charge transfer can be enhanced.

I claim:

1. A CCD type solid state image pickup device comprising:

two-dimensionally arranged photo/electro conversion portions in rows, columns;

a plurality of vertical shift registers each connected to one column of said photo/electro conversion portions;

a horizontal output register connected to said vertical shift registers;

means for transferring first signal charges of each column of said photo/electro conversion portions to one of said vertical shift registers, so that every two of said first signal charges are combined into one of second signal charges within said vertical shift registers;

means for transferring said second signal charges from said vertical shift registers to said horizontal output register, so that every two of said second signal charges are combined into one of third signal charges within said horizontal output register; and means for transferring said third signal charges within said horizontal output register.

2. The device as set forth in claim 1, wherein each of said vertical shift registers comprises:

a plurality of first transfer electrodes each corresponding to one of said photo/electro conversion portions; and a plurality of second transfer electrodes each adjacent to one of said first transfer electrodes, said first transfer electrodes being four-phase operated, said second transfer electrodes being two-phase operated.

3. The device as set forth in claim 1, further comprising interlacing means for changing a combination of said second signal charges in said third signal charges to generate an even field image and an odd field image from said horizontal output register.

4. A CCD type solid state image pickup device comprising:

two-dimensionally arranged photo/electro conversion portions in rows, columns;

a plurality of vertical shift registers each connected to one column of said photo/electro conversion portions;

a horizontal output register connected to said vertical shift registers;

means for transferring first signal charges of each column of said photo/electro conversion portions to one of said vertical shift registers, so that every four of said first signal charges are combined into one of second signal charges within said vertical shift registers;

means for transferring said second signal charges from said vertical shift registers to said horizontal output register; and means for transferring said second signal charges within said horizontal output register.

5. The device as set forth in claim 4, wherein each of said vertical shift registers comprises:

a plurality of first transfer electrodes each corresponding to one of said photo/electro conversion portions; and a plurality of second transfer electrodes each adjacent to one of said first transfer electrodes, said first transfer electrodes being four-phase operated, said second transfer electrodes being four-phase operated.

6. The device as set forth in claim 4, further comprising interlacing means for changing a combination of said first signal charges in said second signal charges to generate an even field image and an odd field image from said horizontal output register.

* * * * *